(12) United States Patent
Moriarty et al.

(10) Patent No.: US 8,780,898 B2
(45) Date of Patent: Jul. 15, 2014

(54) PROCESSOR FOR PACKET SWITCHING BETWEEN CELL STREAMS WITH OPTIONAL VIRTUAL CHANNEL AND CHANNEL IDENTIFICATION MODIFICATION

(75) Inventors: Michael Moriarty, Austin, TX (US); Michael A. Roche, Austin, TX (US); Leslie Zsohar, Round Rock, TX (US)

(73) Assignee: Agere Systems LLC, Allentown, PA (US)

(*) Notice: Subject to any disclaimer, the term of this patent is extended or adjusted under 35 U.S.C. 154(b) by 2116 days.

(21) Appl. No.: 10/285,069

(22) Filed: Oct. 31, 2002

(65) Prior Publication Data
US 2004/0085956 A1 May 6, 2004

(51) Int. Cl.
| | |
|---|---|
| H04L 12/28 | (2006.01) |
| H04L 12/56 | (2006.01) |
| G06F 15/163 | (2006.01) |
| H04J 3/26 | (2006.01) |
| H04L 12/54 | (2013.01) |
| H04L 12/10 | (2006.01) |
| H04W 88/08 | (2009.01) |

(52) U.S. Cl.
CPC ............ H04L 12/5601 (2013.01); H04L 12/10 (2013.01); *H04W 88/08* (2013.01)
USPC ...... 370/389; 370/392; 370/395.1; 370/395.6; 370/476; 370/506; 370/329; 370/437; 370/462; 370/474; 370/535; 370/200.1; 370/200.11; 370/505; 370/412; 709/217; 709/219; 709/224; 709/230

(58) Field of Classification Search
CPC . H04L 12/5601; H04L 47/10; H04L 47/2408; H04L 47/2441; H04L 47/2416; H04L 12/5693; H04L 47/16; H04L 47/17; H04L 47/41; H04L 47/6215; H04W 72/042; H04Q 11/0478
USPC ............ 370/395.51–395.65, 395.71, 395.72, 370/409–413, 238.1, 349, 299–300; 709/217–249
See application file for complete search history.

(56) References Cited

U.S. PATENT DOCUMENTS

| | | | | |
|---|---|---|---|---|
| 5,579,480 A | * | 11/1996 | Cidon et al. ................... | 709/243 |
| 5,699,369 A | * | 12/1997 | Guha ............................ | 714/774 |

(Continued)

OTHER PUBLICATIONS

"Voice Packet Processor," Product Brief, Agere Systems Inc. (Apr. 2001).

*Primary Examiner* — Ayaz Sheikh
*Assistant Examiner* — Venkatesh Haliyur
(74) *Attorney, Agent, or Firm* — Ryan, Mason & Lewis, LLP

(57) ABSTRACT

A network or other type of processor operates to switch packets from an incoming cell stream to an outgoing cell stream. Each received and transmitted cell in a cell stream includes portions of packets, or complete packets or both. Packets are reassembled from incoming cells, and outgoing cells may be created from portions of packets, complete packets or both. The packets in the outgoing cells may be from incoming packets, switched reassembled packets or both. Each incoming and outgoing cell is associated with one virtual channel, and each virtual channel for an outgoing cell may be different from the virtual channel corresponding to the incoming cell or cells from which a packet was reassembled. Switched packets also may have their conversation identifications changed. Partial packets or partial cells that are awaiting completion are retained such that switching capabilities associated with the virtual channel and channel identification modifications may be used.

31 Claims, 16 Drawing Sheets

(56) References Cited

U.S. PATENT DOCUMENTS

| | | | |
|---|---|---|---|
| 5,818,842 A * | 10/1998 | Burwell et al. | 370/397 |
| 5,844,887 A * | 12/1998 | Oren et al. | 370/218 |
| 5,872,784 A * | 2/1999 | Rostoker et al. | 370/395.64 |
| 6,128,305 A * | 10/2000 | Hjalmtysson et al. | 370/410 |
| 6,151,319 A * | 11/2000 | Dommety et al. | 370/395.52 |
| 6,188,690 B1 * | 2/2001 | Holden et al. | 370/390 |
| 6,243,387 B1 * | 6/2001 | Hjalmtysson et al. | 370/410 |
| 6,345,050 B1 * | 2/2002 | Alleyne et al. | 370/389 |
| 6,396,809 B1 * | 5/2002 | Holden et al. | 370/236 |
| 6,445,705 B1 * | 9/2002 | Holden et al. | 370/394 |
| 6,449,274 B1 * | 9/2002 | Holden et al. | 370/392 |
| 6,466,591 B1 * | 10/2002 | See et al. | 370/535 |
| 6,510,166 B2 * | 1/2003 | McClary | 370/505 |
| 6,546,015 B1 * | 4/2003 | Natanson et al. | 370/395.53 |
| 6,556,573 B1 * | 4/2003 | Kaaresoja | 370/395.64 |
| 6,556,577 B2 * | 4/2003 | Hjalmtysson et al. | 370/410 |
| 6,574,224 B1 * | 6/2003 | Brueckheimer et al. | 370/395.6 |
| 6,597,689 B1 * | 7/2003 | Chiu et al. | 370/354 |
| 6,611,525 B1 * | 8/2003 | Natanson et al. | 370/395.53 |
| 6,618,380 B1 * | 9/2003 | Mehta et al. | 370/395.42 |
| 6,618,383 B1 * | 9/2003 | Tomlins | 370/395.5 |
| 6,639,901 B1 * | 10/2003 | Katzri et al. | 370/255 |
| 6,650,646 B1 * | 11/2003 | Galway et al. | 370/397 |
| 6,700,878 B2 * | 3/2004 | Salloum Salazar et al. | 370/329 |
| 6,724,779 B1 * | 4/2004 | Alleyne et al. | 370/517 |
| 6,782,035 B1 * | 8/2004 | Nakamura et al. | 375/130 |
| 6,990,108 B2 * | 1/2006 | Karlsson et al. | 370/395.6 |
| 7,023,856 B1 * | 4/2006 | Washabaugh et al. | 370/395.1 |
| 7,095,780 B2 * | 8/2006 | Nakamura et al. | 375/146 |
| 7,203,198 B2 * | 4/2007 | Knight et al. | 370/395.54 |
| 2002/0003804 A1 * | 1/2002 | Hjalmtysson et al. | 370/410 |
| 2002/0015405 A1 * | 2/2002 | Sepponen et al. | 370/389 |
| 2002/0131457 A1 * | 9/2002 | Akiyama | 370/519 |
| 2002/0146014 A1 * | 10/2002 | Karlsson et al. | 370/395.6 |
| 2002/0176424 A1 * | 11/2002 | Knight et al. | 370/395.4 |
| 2004/0085956 A1 * | 5/2004 | Moriarty et al. | 370/389 |
| 2004/0202149 A1 * | 10/2004 | Karlsson et al. | 370/352 |

* cited by examiner

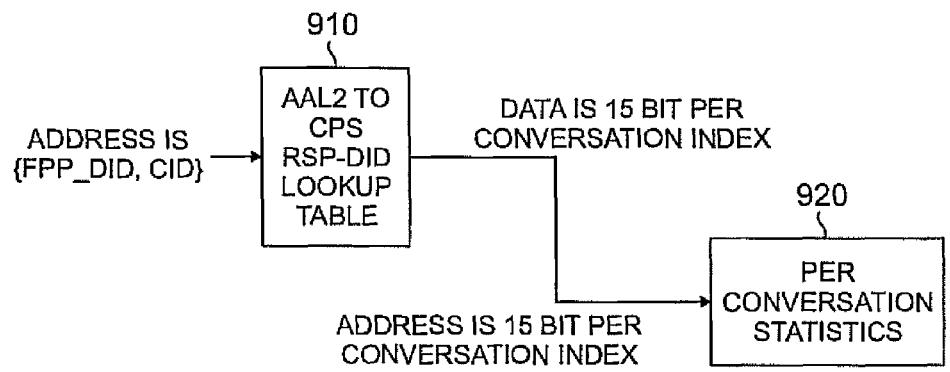
FIG. 9A
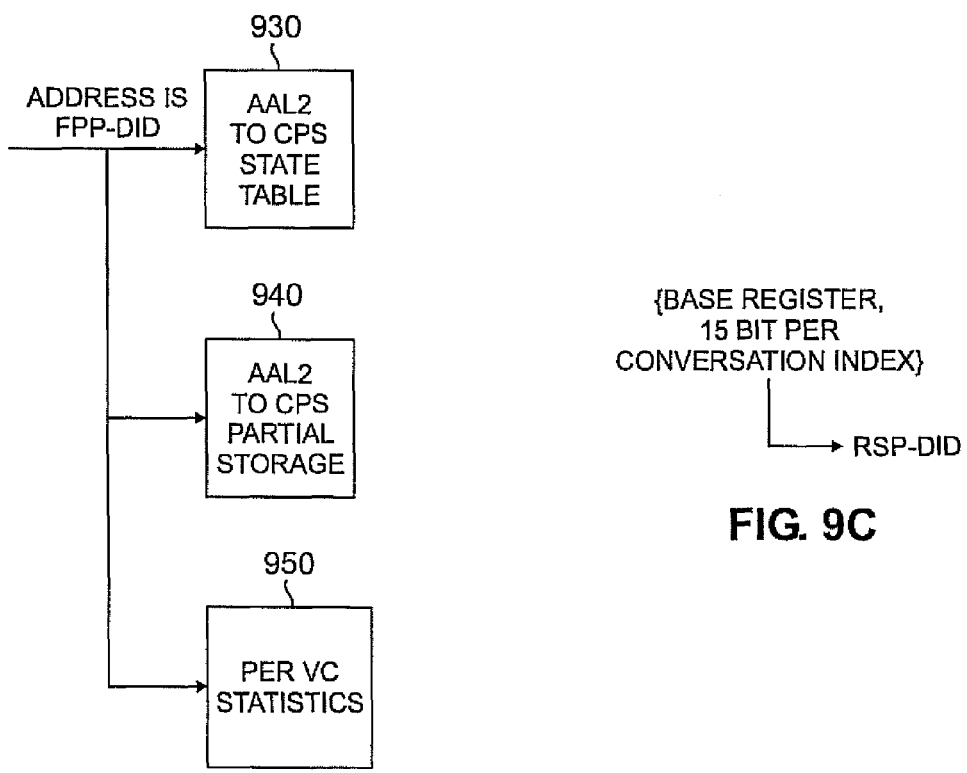
FIG. 9B
FIG. 9C

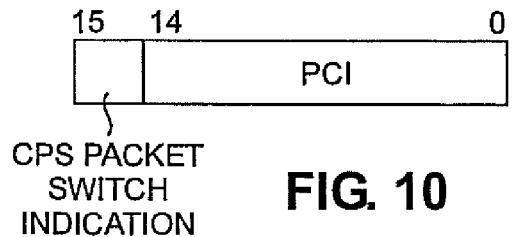
FIG. 10
| STATE NAME | DESCRIPTION |
|---|---|
| PCI | 15-BIT PER CONVERSATION INDEX |
| CPS PACKET SWITCH INDICATION | ZERO INDICATES OUTPUT; ONE INDICATES THE SECOND-PASS INPUT QUEUE |
FIG. 11
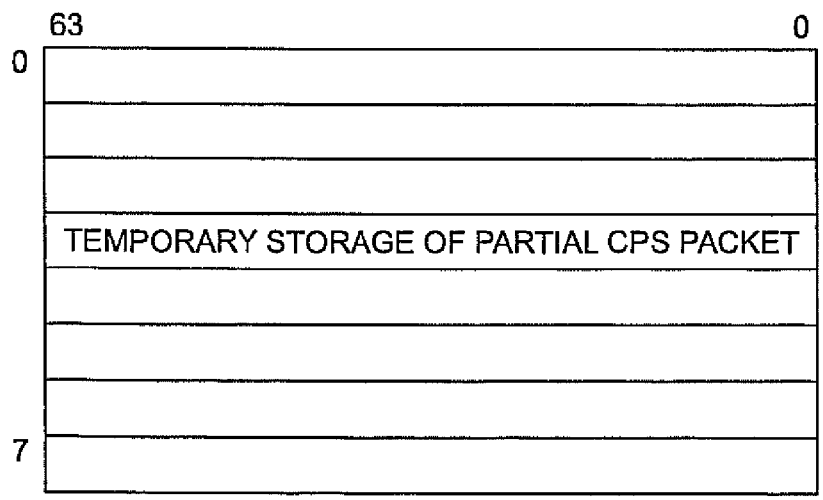
FIG. 12

| STATE NAME | DESCRIPTION |
| --- | --- |
| STORED BYTES | 7-BIT NUMBER SPECIFYING NUMBER OF BYTES PRESENTLY STORED IN THIS ENTRY; IF VALUE IS 0, THERE IS NO PARTIAL CPS PACKET STORED; IF THE NUMBER IS 1, THE LENGTH IS NOT STORED AND STATE MACHINE MUST TAKE SPECIAL PATH TO DETERMINE LENGTH CORRECTNESS; HOST MUST RESET THIS FIELD BEFORE ANY CELLS ARE RECEIVED ON THE CONNECTION. |
| STORED OUTPUT RSP DID | 15-BIT RSP-DID USED IN THE OUTPUT TRANSMIT COMMAND; TEMPORARY STORAGE FOR THIS VALUE; HARDWARE RETRIEVES IT FROM THE AAL2 TO CPS RSP-DID LOOKUP TABLE; ALLOWS LOOKUP TO BE PERFORMED ONLY ONCE, AND DURING A TIME WHEN A READ FROM THIS SSRAM IS NOT REQUIRED TO GET THE ADDRESS FOR THE LOOKUP |
| EXPECTED SEQUENCE NUMBER | 1-BIT VALUE OF NEXT EXPECTED SEQUENCE NUMBER OF AAL2 CELL; HOST MUST RESET THIS FIELD BEFORE ANY CELLS ARE RECEIVED ON THE CONNECTION |
| TYPE 3 ENABLE | 1-BIT ENABLE FOR TYPE 3 HANDLING ON THE VC, FOR INVALID RSP-DID (BIT 14) |
| CPS HEADER | 24-BIT RECEIVED CPS HEADER |
| TYPE 3 ENABLE | 1-BIT ENABLE FOR TYPE 3 HANDLING ON THE VC, FOR VALID RSD-DID (BIT 15) |

FIG. 14A

| STATE NAME | DESCRIPTION |
| --- | --- |
| STORED INVALID CID | USED BY HARDWARE TO TAG AN INVALID CID ON A CPS PACKET SPLIT BETWEEN TWO AAL2 CELLS. |

FIG. 14B

{BASE REGISTER,
14 BITS PER VC INDEX}
└──→ RSP-DID

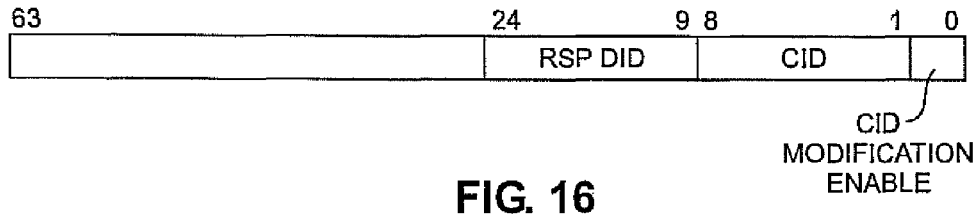

FIG. 16

| STATE NAME | DESCRIPTION |
|---|---|
| RSP-DID | 14-BIT RSP-DID TO BE SENT IN THE OUTPUT TRANSMIT COMMAND; HOST MUST SET IT TO CORRECT OUTPUT RSP-DID TO BE USED IN THE AAL2 TRANSMIT COMMAND; HARDWARE WILL ONLY READ THIS FIELD, NEVER MODIFY IT |
| CID | 8-BIT VALUE TO REPLACE THE EXISTING CID OF THE PACKET; NOTE THAT THIS FUNCTION MAY NOT BE ADDED IF THE CPS SWITCHING FUNCTION IS NOT ADDED |
| CID MODIFICATION ENABLE | 1-BIT VALUE INDICATING WHETHER THE CID SHOULD BE REPLACED IN THE PACKET; 1 = REPLACE |

FIG. 17

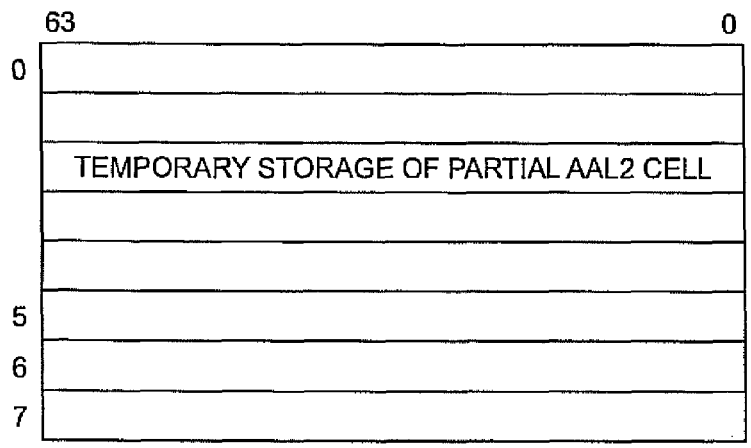

FIG. 18

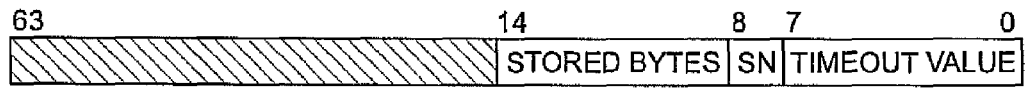

FIG. 19

| STATE NAME | DESCRIPTION |
|---|---|
| STORED BYTES | 6-BIT VALUE TO SPECIFY NUMBER OF BYTES -1 PRESENTLY STORED IN THE ENTRY; IF NUMBER IS DECIMAL 47, THERE IS NO PARTIAL AAL2 CELL STORED; HOST MUST SET THIS FIELD TO DECIMAL 47 BEFORE ANY CELLS ARE RECEIVED ON THE CONNECTION |
| TIMEOUT VALUE | 8-BIT VALUE TO SPECIFY TIMEOUT VALUE FOR THE VC |
| SEQUENCE NUMBER | 1-BIT VALUE OF NEXT SEQUENCE NUMBER OF AN OUTPUT AAL2 CELL; HOST MUST RESET THIS FIELD BEFORE ANY CELLS ARE RECEIVED ON THE CONNECTION |

FIG. 20

PROCESSOR FOR PACKET SWITCHING BETWEEN CELL STREAMS WITH OPTIONAL VIRTUAL CHANNEL AND CHANNEL IDENTIFICATION MODIFICATION

FIELD OF THE INVENTION

The present invention relates generally to packet processing systems, and more particularly to a network processor or other type of processor configured for operation with data on virtual channels.

BACKGROUND OF THE INVENTION

A network processor generally controls the flow of data between a physical transmission medium, such as a physical layer portion of, e.g., an asynchronous transfer mode (ATM) network, and a switch fabric in a router or other type of packet switch. In an ATM network, an ATM Adaptation Layer 2 (AAL2) defines an interface between the transport bearers, e.g., the physical hardware, of the ATM network and an application that is producing information. AAL2 is described in more detail in, for instance, International Telecommunication Union (ITU) Recommendation I.363.2 (1997), the disclosure of which is hereby incorporated by reference. The network processor works in accordance with protocols defined by AAL2 and by ATM in order to create ATM cells containing AAL2 data or to decompose the ATM cells into AAL2 data.

One important type of information contained in AAL2 data is common part sublayer (CPS) packets, which usually contain voice information, video information, or other time-sensitive information. During transmission, voice information, for instance, is generally packaged into CPS packets, which are then packaged into ATM cells. AAL2 layers act as intermediaries between the ATM layer and an access point generating or receiving the CPS packets. Furthermore, the AAL2 specification defines how the CPS packets are packaged into AAL2 cells, which are subsequently packaged into ATM cells. The ATM cells can contain whole or partial CPS packets. During reception, the CPS packets are then recreated from the ATM cells. Voice information is subsequently recreated from the CPS packets.

Voice and other information are handled over ATM networks by creating "virtual channels" through which the information is carried. Additionally, the CPS packets have "channel identifications" (CIDs), also called "connection identifications," which identify to which "conversation" the CPS packet belongs. Thus, it is possible for one ATM cell, associated with a single virtual channel, to contain voice data from multiple conversations.

Voice over ATM networks is becoming increasingly important because networks that once carried only data are now being merged with or connected to voice networks. It is also important that network processors be able to adequately handle voice information, or other similar information, using AAL2 or other suitable protocols. In particular, a network processor has to handle many different virtual channels and conversations at one time.

A need therefore exists for processors able to adequately handle packets, cells, and their virtual channels and conversations.

SUMMARY OF THE INVENTION

The present invention provides techniques for switching packets between cell streams with optional virtual channel and channel identification modification.

In accordance with one aspect of the invention, a network processor or other type of processor switches packets from an incoming cell stream to an outgoing cell stream. Each incoming or outgoing cell in a cell stream may include portions of packets, complete packets or both. Packets are reassembled from incoming cells, and outgoing cells may be created from portions of packets, complete packets or both. The packets in the outgoing cells are from incoming packets, switched reassembled packets or both. Each incoming and outgoing cell is associated with one virtual channel, and a virtual channel for an outgoing cell may be different from the virtual channel corresponding to the incoming cell or cells from which a packet was reassembled.

For example, an illustrative embodiment of the present invention comprises a processor having assembly circuitry adapted to select a virtual channel for an outgoing cell. The outgoing cell comprises at least a portion of one or more previously assembled packets, each of the previously assembled packets corresponding to a certain virtual channel. Additionally, the assembly circuitry is adapted to select the virtual channel for the outgoing cell so that the selected virtual channel can be different than the virtual channel or virtual channels corresponding to the one or more previously assembled packets.

Another illustrative embodiment of the present invention comprises a processor having assembly circuitry adapted to assemble outgoing cells from packets, each outgoing cell comprising at least a portion of a packet. Additionally, the processor comprises parsing circuitry coupled to the assembly circuitry, the parsing circuitry adapted to examine incoming cells, each incoming cell comprising at least a portion of one or more packets. The parsing circuitry is adapted to reassemble packets from at least a portion of one or more of the incoming cells, wherein the parsing circuitry is further adapted to select reassembled packets to be routed to the assembly circuitry. The processor also comprises switching circuitry adapted to couple the selected reassembled packets to the assembly circuitry for assembly into outgoing cells.

In accordance with another aspect of the invention, switched packets may also have their conversation identifications changed.

In accordance with a further aspect of the invention, partial packets or partial cells that are awaiting completion are retained such that switching capabilities associated with the virtual channel and channel identification modifications of present invention may be used.

BRIEF DESCRIPTION OF THE DRAWINGS

FIGS. 9A through 9C show flow, through an AAL2 cell parser, of a fast pattern processor-destination identification (FPP-DID) in accordance with a preferred embodiment of the invention;

FIG. 10 shows a block diagram of an entry in an AAL2 to CPS routing switch processor-destination identification (RSP-DID) lookup table, in accordance with a preferred embodiment of the invention;

FIG. 11 shows a table describing the variables in FIG. 10, in accordance with a preferred embodiment of the invention;

FIG. 12 shows an exemplary memory configuration for storing a partial CPS packet, in accordance with a preferred embodiment of the invention;

FIGS. 14A and 14B are tables describing the variables used in FIG. 13, in accordance with a preferred embodiment of the invention;

FIG. 16 shows a block diagram of an entry in a CPS to AAL2 lookup table, in accordance with a preferred embodiment of the invention;

FIG. 17 shows a table describing the variables used in FIG. 16, in accordance with a preferred embodiment of the invention;

FIG. 18 shows an exemplary memory configuration for storing a partial AAL2 cell, in accordance with a preferred embodiment of the invention;

FIG. 19 shows an example of an entry in a CPS to AAL2 state table, in accordance with a preferred embodiment of the invention; and FIG. 20 describes the variables used in FIG. 19, in accordance with a preferred embodiment of the invention.

DETAILED DESCRIPTION

Figure 1:
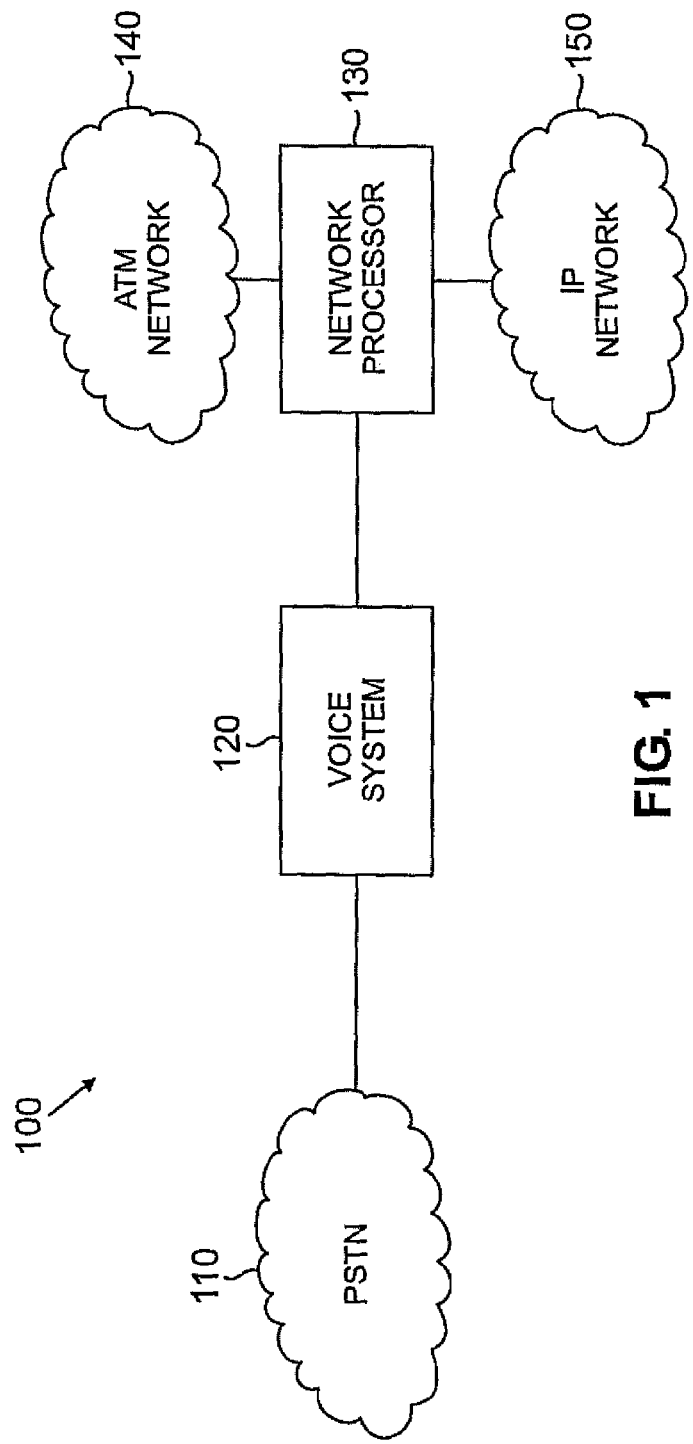
FIG. 1 is a simplified block diagram of an illustrative embodiment of a processing system in which the present invention is implemented.

The present invention, in an illustrative embodiment thereof, allows CPS packets to be switched between AAL2 streams, with optional CID modification. A CPS packet is part of an AAL2 cell, which becomes part of an ATM cell. Thus, an ATM cell is used to "carry" an AAL2 cell, which carries one or more partial or complete CPS packets. In the previously cited AAL2 specification, one or more portions or complete CPS packets are formed into a CPS-protocol data unit (CPS-PDU) having additional information other than the one or more portions or complete CPS packets. The CPS-PDU is called an "AAL2 cell" herein. Each ATM cell has a virtual channel that is defined by a virtual path identifier (VPI) and a virtual channel identifier (VCI), referred to as "VPI/VCI" herein. A network processor operating in accordance with the present invention receives incoming CPS packets and creates outgoing AAL2 cells from the incoming CPS packets. Thus, the network processor creates an output AAL2 cell stream. This creation of outgoing AAL2 cells is performed by AAL2 cell assembly circuitry. The network processor also creates outgoing ATM cells from the AAL2 cells.

The network processor additionally receives incoming AIM cells having AAL2 cells embedded therein. Thus, the network processor receives an incoming AAL2 cell stream From the incoming AAL2 cells, the network processor reassembles CPS packets. The reassembly of CPS packets is performed by AAL2 parsing circuitry, which parses the incoming AAL2 cells to reassemble complete CPS packets from the partial or complete CPS packets in the incoming AAL2 cell stream The network processor is adapted to switch certain reassembled CPS packets from the incoming AAL2 cell stream to the outgoing AAL2 cell stream. During the switching process, certain tables are used to determine whether a reassembled CPS packet should be switched to be repackaged into outgoing AAL2 cells. Although other suitable techniques for switching may be used, tables will be described herein. Generally, certain tables are initially populated by an external controller, such as a host processor, and some of the tables are maintained and updated by portions of the network processor.

Additional tables are used to determine whether the CID of a reassembled CPS packet that is being switched should be changed. Thus, the present invention allows CPS packets to be switched between virtual channels and also between conversations.

Additional tables are also used to keep track of partial CPS packets (e.g., when CPS packets are being reassembled from received AAL2 cells) and partial AAL2 cells (e.g., when incoming CPS packets are being assembled into AAL2 cells that will be transmitted). The techniques for storing partial CPS packets and AAL2 cells are such that the virtual channel and conversation switching of the present invention are available for use, if such use is desired.

The present invention will be illustrated herein in conjunction with an exemplary system for processing data for transmission through a network. The exemplary system includes a network processor configured in a particular manner in order to illustrate the techniques of the invention. It should be understood, however, that the invention is more generally applicable to any processor in which it is desirable to provide packet switching between virtual channels and with optional conversation modification.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

FIG. 1 shows a network processing system 100 in which the invention is implemented. Network processing system 100 comprises a public switched telephone network (PSTN) 110, a voice system 120, a network processor 130, an ATM network 140, and an internet protocol (IP) network 150. The PSTN 110 is also commonly called the "plain old telephone service" network or the POTS network. The voice system 120 converts conversations on the PSTN 110 to CPS packets that are passed to the network processor 130. Conversely, CPS packets are passed from the network processor 130 to the voice system 120. The voice system 120 may also perform functions such as voice compression, echo cancellation, dual tone multifrequency interpretation or generation, facsimile transfer, and generation or deciphering of real-time transfer protocol (RTP) packets. Consequently, RTP packets may be passed by the voice system 120 to the network processor 130 and received by the voice system 120 from the network processor 130. Digitized speech or packets of other circuit switched data are transferred between the voice system 120 and network processor 130.

The network processor 130 performs classification of received packets or cells in order to determine how to handle the packets or cells. It should be noted that the terms "packet" and "cell" are generally considered synonymous. However, in this disclosure, a "cell" is considered to be a larger data unit and a packet is considered to be a smaller data unit. Therefore, a cell comprises packets or portions thereof, but a packet is too small to fit all of the data in a cell. A cell may also comprise other cells. For example, in one embodiment of the present invention, an ATM cell comprises an AAL2 cell, which comprises portions or complete CPS packets. This choice in terminology is strictly for convenience.

The network processor 130 creates ATM cells from the CPS packets and transmits these cells over the ATM network 140. RTP packets pass through the network processor 130 and are transmitted to the IP network 150. The network processor 130 adds an appropriate IP header to the RTP packets. Similarly, real-time transport protocol packets pass from the IP network 150 through the network processor 130 and to the voice system 120. In this situation, the network processor 130 can remove IP headers associated with the RTP packets. The network processor 130 also performs scheduling, queuing, and routing functions, as is known in the art.

Although FIG. 1 and remaining figures assume that CPS packets are created using voice data, it should be understood that the type of data used in CPS packets is immaterial for the present invention. For instance, the CPS packets could contain video information.

Figure 2:
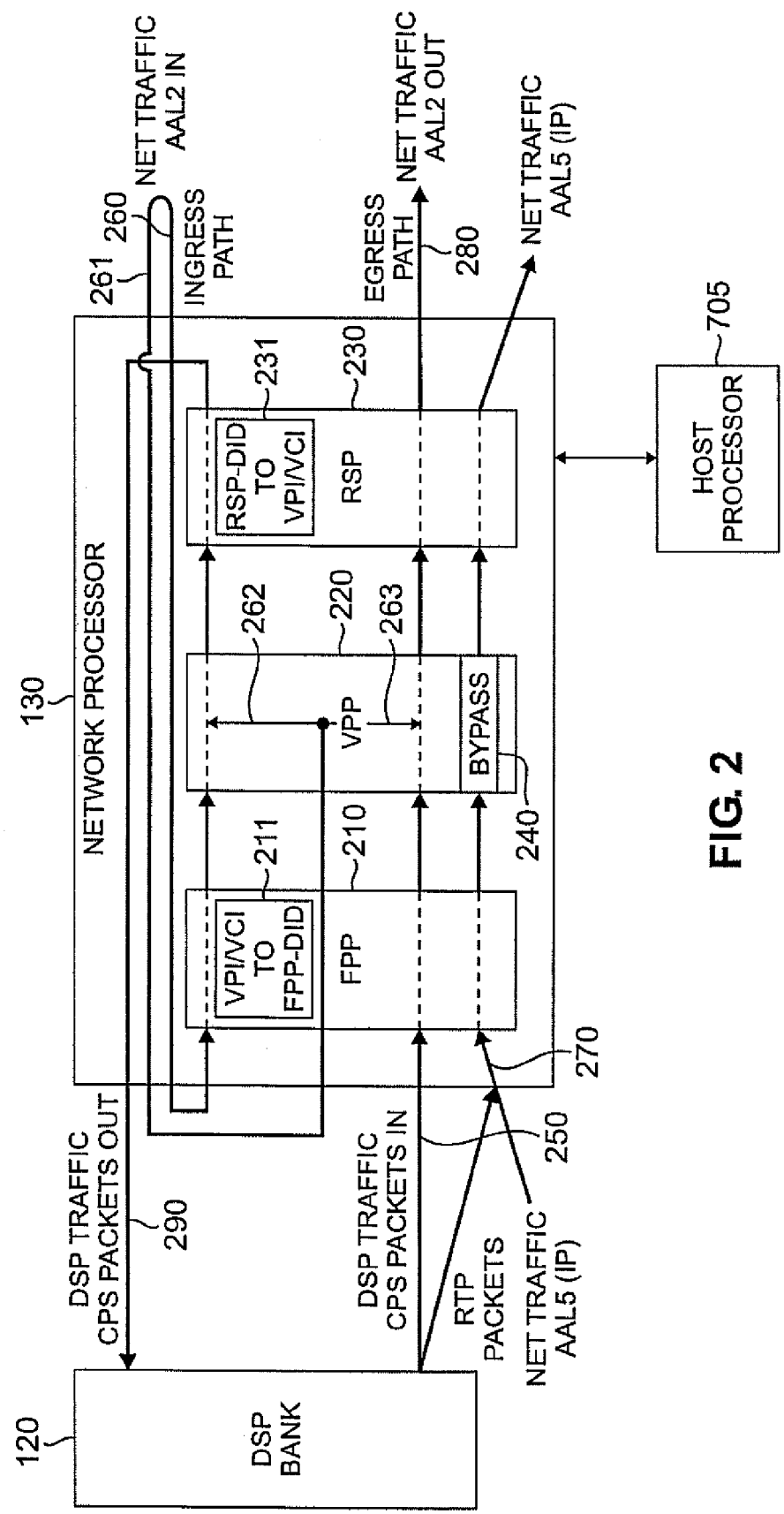
FIG. 2 is a simplified block diagram of one possible implementation of a network processor, shown interacting with a voice system, in accordance with a preferred embodiment of the invention.

Referring now to FIG. 2, network processor 130 is shown interacting with a voice system 120, which in this example is a digital signal processor (DSP) bank having a number of digital signal processors. Illustratively, the network processor 130 comprises a fast pattern processor (FPP) 210, a voice packet processor (VPP) 220, and a routing switch processor (RSP) 230. FIG. 2 is used to illustrate exemplary data flow through the network processor 130. Fast pattern processor 210 comprises a VPI/VCI to fast pattern processor-destination identification (FPP-DID) lookup table 211. Similarly, routing switch processor 230 comprises a routing switch processor-destination identification (RSP-DID) to VPI/VCI lookup table 231. The network processor 130 is shown in FIG. 2 interacting with a host processor 705.

The voice system 120 creates CPS packets that are delivered to the network processor 130. The voice system 120 also creates RTP packets that are coupled to the network processor 130. The fast pattern processor 210 accepts a data stream of protocol data units (PDUs) from an industry-standard POS-PHY/UTOPIA Level 3 interface. This interface is described, for instance, in the ATM Forum specification AF-PHY-0143.000 (2000), the disclosure of which is hereby incorporated by reference. After it classifies the PDUs, the fast pattern processor 210 sends the packets and conclusions to the voice packet processor 220, which sends processing results and bypass traffic to the routing switch processor 230 on a POS-PHY Level 3 interface.

The fast pattern processor 210 delivers three types of PDUs to the voice packet processor 220: AAL2 cells (defined by the previously cited AAL2 specification), CPS packets, and other PDUs. The relationship between an "AAL2 cell" and a "CPS packet" is described below in reference to FIGS. 4 and 5. Briefly, a "CPS-PDU," as defined by the AAL2 specification, is called an "AAL2 cell" herein. The voice packet processor 220 provides AAL2 protocol processing. Traffic requiring AAL2 processing is identified by the fast pattern processor 210 for processing by the voice packet processor 220. The processed AAL2 traffic is sent to the routing switch processor 230 for routing and any additional processing needed. Traffic that does not require AAL2 processing is transparently passed through the voice packet processor 220 to the routing switch processor 230.

Illustratively, there are three ingress paths for data through the network processor 130. The first ingress path contains incoming CPS packets, generally containing voice information, and is illustrated by reference 250. The second ingress path contains incoming ATM cells that comprise CPS packets or portions thereof. This path is illustrated by references 260 and 261. The "AAL2 in" in FIG. 2 refers to the fact that the ATM cells comprise payloads defined by the AAL2 specification, which includes CPS packets and portions thereof. This is explained below in greater detail in reference to FIGS. 4 and 5. The third ingress path contains all other traffic, such as RTP packets and ATM cells having payloads defined by the AAL5 specification. This path is illustrated by reference 270.

The incoming CPS packets on the first ingress path 250 are sent to the voice packet processor 220, where the incoming CPS packets are packaged into outgoing ATM cells and transmitted over a network traffic egress path, illustrated by reference 280. The "AAL2 out" in FIG. 2 refers to the fact that the ATM cells comprise payloads defined by the AAL2 specification, which includes CPS packets and portions thereof. As noted above, this is explained in greater detail in reference to FIGS. 4 and 5. Other traffic, on the third ingress path illustrated by reference 270, is bypassed by voice packet processor 220. This is shown through bypass queue 240.

Network traffic on the portion of the ingress path illustrated by reference 260 passes through the voice packet processor 220, where the ATM cells are parsed into CPS packets. The CPS packets are then output through an egress path illustrated by reference 290.

Alternatively, network traffic on the portion of the ingress path illustrated by reference 261 passes through the voice packet processor 220, where the incoming ATM cells are parsed into reassembled CPS packets. However, under predetermined conditions, the reassembled CPS packets then can be sent to the digital signal processor bank, as illustrated by reference 262, or repackaged into outgoing ATM cells, as illustrated by reference 263. The transfer of reassembled CPS packets to outgoing ATM cells is called "switching" herein, as CPS packets are switched from one ATM cell stream, containing AAL2 cells, to another ATM cell stream, also containing AAL2 cells. When the reassembled CPS packets are repackaged into outgoing ATM cells, the virtual channel for the outgoing ATM cell may not be the same virtual channel corresponding to the incoming ATM cell or cells from which the CPS packets were parsed. A definition of "virtual channel" is given below in reference to FIG. 4. Consequently, virtual channels can be changed for the CPS packets. Moreover, each CPS packet has a channel identification associated with it. The channel identifications may also be changed when the CPS packets are repackaged into AAL2 cells.

Figure 2A:
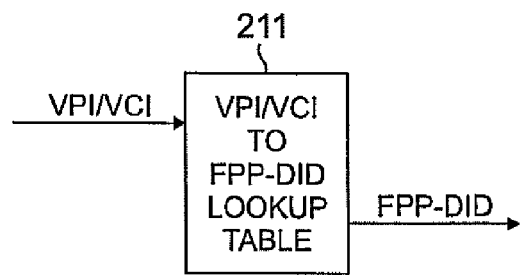
FIG. 2A shows flow, through a fast pattern processor (FPP), of a virtual path identifier (VPI) and a virtual channel identifier (VCI), called a "VPI/VCI" herein, in accordance with a preferred embodiment of the invention.

As explained in more detail below, the fast pattern processor 210 processes ATM cells and removes ATM headers from the cells. The remaining AAL2 cells and other data are transported to the voice packet processor 220. The fast pattern processor 210 communicates information about the PDUs to the voice packet processor 220, such as a destination identification and what type of PDU is contained in the data being transferred (e.g., CPS packet, AAL2 cells, and other PDUs). The destination identification from the fast pattern processor 210 to the voice packet processor 220 is called an FPP-DID herein. In order to communicate the FPP-DID to the voice packet processor 220, the fast pattern processor 210 determines the FPP-DID via the VPI/VCI to FPP-DID lookup table 211. This is shown in FIG. 2A, which shows a path the VPI/VCI takes through the fast pattern processor 210. As shown in FIG. 2A, the fast pattern processor 210 uses the VPI/VCI as an address into the VPI/VCI to FPP-DID lookup table 211 to produce an FPP-DID. Each entry in the VPI/VCI to FPP-DID lookup table 211 comprises a 21-bit FPP-DID. The VPI/VCI is generally 21 bits long, but the VPI/VCI to FPP-DID lookup table 211 "compresses" this information to 21 bits, of which 14 or 15 bits are used. The use of only 14 or 15 bits is because these numbers of bits allow approximately 16 or 32 thousand virtual channels, respectively.

Figure 2B:
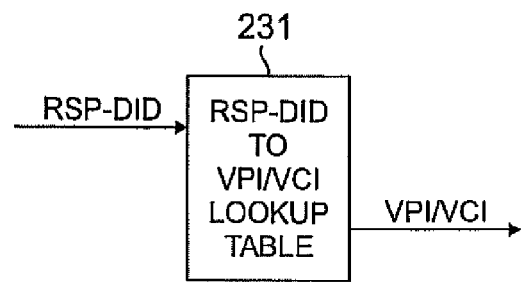
FIG. 2B shows flow, through a routing switch processor (RSP), of a routing switch processor-destination identification, in accordance with a preferred embodiment of the invention.

The voice packet processor 220 will inform the routing switch processor 230 of information such as a destination identification and what type of packet is contained in the data being transferred (e.g., CPS packet, AAL2 cells, or other PDUs). The destination identification from the voice packet processor 220 to the routing switch processor 230 is called the RSP-DID herein. In order to determine a VPI/VCI for an outgoing ATM cell, the routing switch processor 230 uses the RSP-DID to VPI/VCI lookup table 231 to determine a VPI/VCI from an RSP-DID. This is shown in FIG. 2B, which shows a path an RSP-DID takes through the routing switch processor 230. As shown in FIG. 2B, the routing switch processor 230 uses the RSP-DID as an address into the RSP-DID to VPI/VCI lookup table 231 to produce a VPI/VCI. Each entry in the RSP-DID to VPI/VCI lookup table 231 comprises a 24-bit VPI/VCI. As described above, the VPI/VCI is generally 24 bits long, and the RSP-DID to VPI/VCI lookup table 231 decompresses the 16-bit RSP-DID to 24 bits of VPI/VCI. Usually, only 14 or 15 bits of the RSP-DID are used, as these numbers of bits allow approximately 16 or 32 thousand virtual channels, respectively.

The VPI/VCI to FPP-DID lookup table 211 and the RSP-DFD to VPI/VCI lookup table 231 are loaded by an external processor, such as host processor 705. The host processor 705 is described below in more detail in reference to FIG. 7. Briefly, a device such as the host processor 705 loads the tables 211 and 231 in order to route ATM cells in a desired manner.

Figure 3:
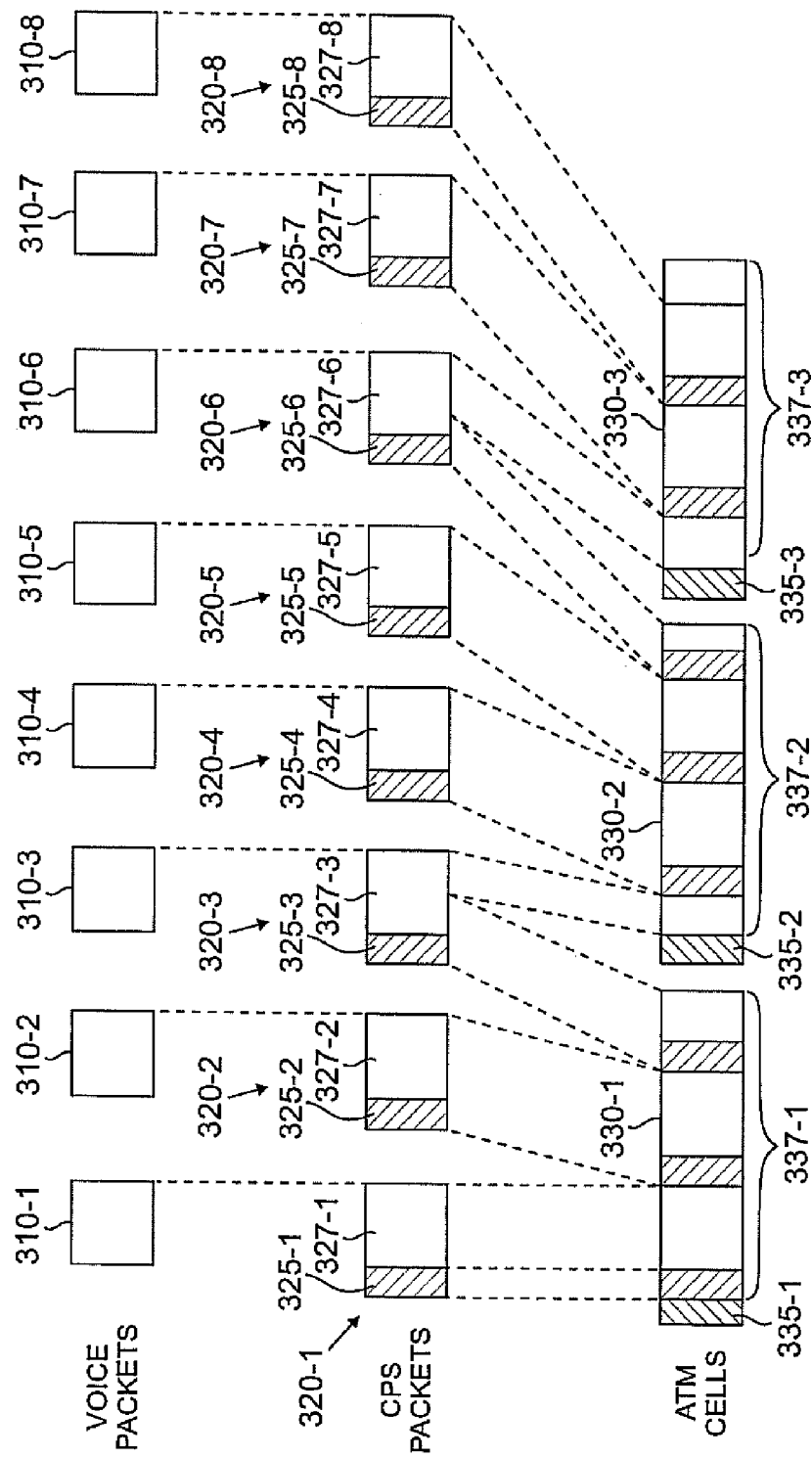
FIG. 3 is a block diagram illustrating exemplary relationships between voice information, CPS packets, and ATM cells.
Figure 4:
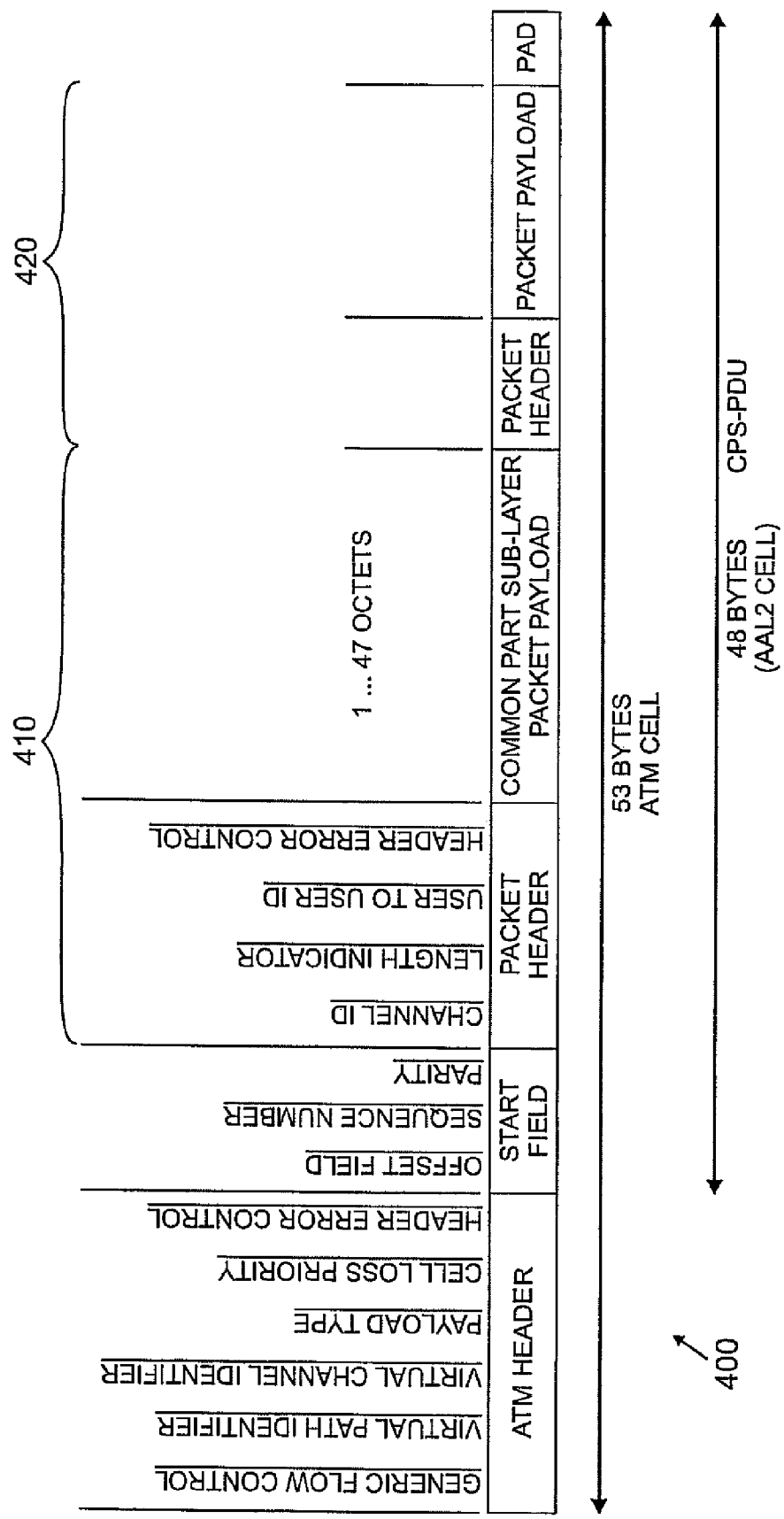
FIG. 4 is a block diagram of an ATM cell, shown according to ATM standards.
Figure 5:
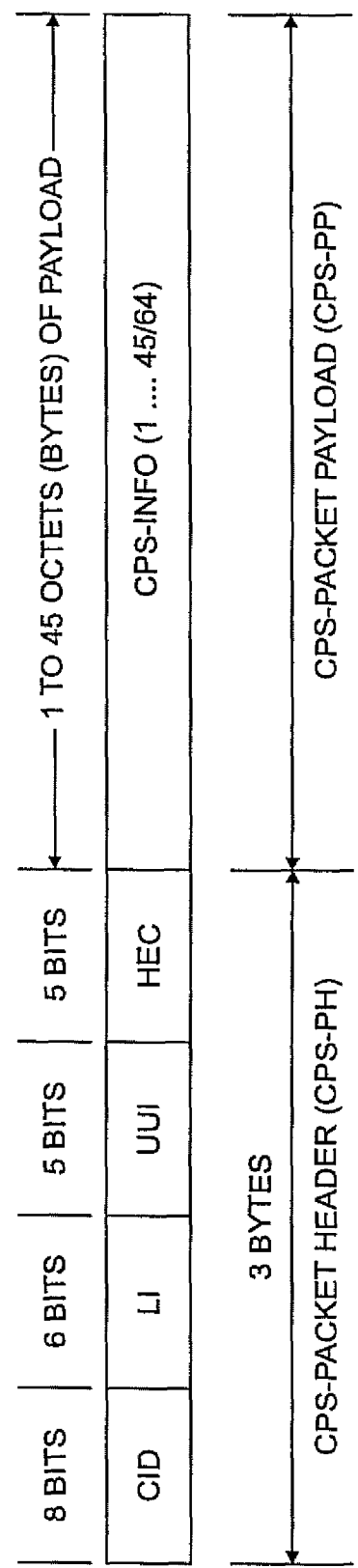
FIG. 5 is a block diagram of a CPS packet, shown according to AAL2 standards.
Figure 6:
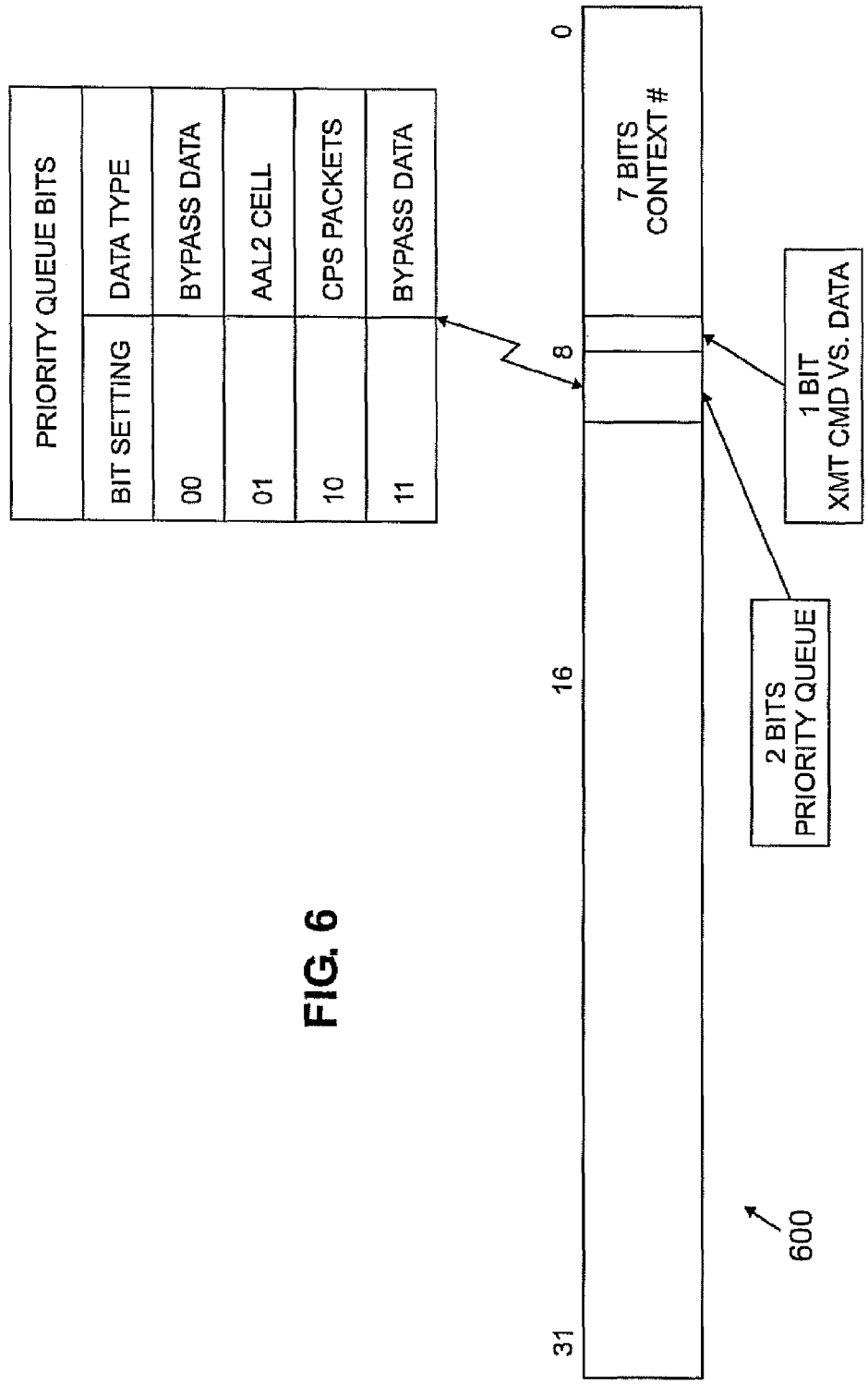
FIG. 6 is a diagram of a data format used in a transmission between a fast pattern processor and a voice packet processor, in accordance with a preferred embodiment of the invention.

Prior to a detailed description of the voice packet processor 220, it is beneficial to provide additional context regarding AAL2 processing. FIGS. 3 through 5 provide a very simple overview of AAL2 processing for voice applications, in particular. FIG. 6 provides an example of a data format used between the voice packet processor 220 and both the fast pattern processor 210 and routing switch processor 230.

Referring now to FIG. 3, a block diagram is shown illustrating exemplary relationships between voice information, CPS packets, and ATM cells. FIG. 3 is a simple diagram used to illustrate how CPS packets are formed into ATM cells, and additional detail is given below with regard to this process. During transmission, voice packets 310-1 through 310-8 (collectively, "voice packets 310") are packaged into CPS packets 320-1 through 320-8 (collectively, "CPS packets 320"). Each voice packet 310 comprises digital voice information, which is generally derived by digitally sampling an analog voice waveform. Additionally, compression may be performed on digital voice samples prior to the digital voice information being placed into voice packets 310. Voice packets 310 are usually created at regular intervals and should arrive at a destination at regular intervals.

CPS packets 320 comprise CPS headers 325-1 through 325-8 and CPS payloads 327-1 through 327-8. ATM cells 330-1 through 330-3 (collectively, "ATM cells 330") are created from multiple CPS packets 330, in this example. ATM cells 330 comprise ATM headers 335-1 (collectively, "ATM headers 335") through 335-3 and ATM payloads 337-1 through 3373 (collectively, "ATM payloads 337"). In the present invention, each ATM payload 337 is an AAL2 cell, as described in additional detail in reference to FIGS. 4 and 5.

In this example, each ATM cell 330 comprises one or more complete CPS packets 320 and one or more portions of a CPS packet 320. When a CPS packet is apportioned into two AAL2 cells 335, the cell is simply separated, as shown by CPS packets 320-3 and 320-6. Information about how the CPS packet is split is placed into a "start field" near the ATM cell header 335, as shown in FIG. 4.

Turning now to FIG. 4, a block diagram of an ATM cell 400 is shown. The ATM cell 400 shown in FIG. 4 is depicted in accordance with ATM standards, such as ATM User-Network Interface (UNI) Specification V3.0 (1993), the disclosure of which is hereby incorporated by reference. ATM cell 400 has 53 bytes, of which 48 bytes are payload, which is an AAL2 cell. The AAL2 cell is defined via the ITU Recommendation 1.363.2, already incorporated by reference above. As described above, a "CPS-PDU" will be referred to as an "AAL2 cell" herein. The ATM cell 400 shown has a user network interface (UNI) header, entitled "ATM header" in FIG. 4. The AAL2 cell comprises a start field, two CPS packets 410, 420, and a pad. Each of the two CPS packets 410, 420 comprises a CPS header and a CPS payload, described in more detail in reference to FIG. 5. The ATM UNI header of the ATM cell 400 comprises a generic flow control, a virtual path identifier (VPI), a virtual channel identifier (VCI), a payload type, a cell loss priority, and a header error control.

What is important about the ATM header, for the aspects of the present invention, is the VPI and VCI. A virtual channel is defined by the VPI and VCI. In general terms, the VPI is a bundle of VCIs. In order to select a particular channel, both the VPI and VCI have to be known.

The start field of the ATM cell 400 comprises an offset field, sequence number, and parity. The offset field is six bits long and indicates the number of bytes between the start field and either the first start of a CPS packet, or the start of the pad field. The pad field is generally filled with zeros and is used to create a packet or AAL2 cell having a particular length. The sequence number is one bit and alternates between one and zero. The parity is one bit and indicates odd parity. The offset field allows incomplete CPS packets to be transported along with complete CPS packets or an additional partial CPS packet. Thus, an AAL2 cell comprises a start field and one or more partial or complete CPS packets.

The fast pattern processor 210 interprets the ATM header and strips the ATM header from the ATM cell 400 prior to sending data from the ATM cell 400 to the voice packet processor 220. Thus, the voice packet processor 220 receives an AAL2 cell. However, as described above, the fast pattern processor 210 communicates the VPI/VCI to the voice packet processor 220 through an FPP-DID.

Turning now to FIG. 5, a CPS packet 500 is shown. CPS packet 500 comprises a header and a payload. The header comprises a channel identification (CID), a length indication (LI), a user-to-user identification (UUI), and a header error control (HEC). The CID value identifies the AAL2 CPS user of the channel. An AAL2 channel is a bidirectional channel. The same value of channel identification should be used for both directions. The values eight through 255 are used to identify the users of the AAL2 CPS. Further discrimination between the two types of users, i.e., service specific convergence sublayer (SSCS) and Layer Management, is provided by the UUI field. The UUI field serves two purposes: it conveys specific information transparently between the CPS users (i.e., between SSCS entities or between Layer Management); and it distinguishes between the SSCS entities and Layer Management users of the CPS. The 5-bit UUI field provides for 32 codepoints, zero through 31. Codepoints zero through 27 are available for SSCS entities and codepoints 30 and 31 are available to Layer Management.

The present invention allows incoming CPS packets associated with a virtual channel, as defined by the VPI/VCI entries, to be retransmitted through ATM cells having different virtual channels. Additionally, the CID of the reassembled CPS packets can be changed before the CPS packets are retransmitted.

The fast pattern processor 210 communicates, along with actual PDUs, several different types of information to the voice packet processor 220. The fast pattern processor 210 sends data to the voice packet processor 220 in segmented blocks over the industry-standard POS-PHY/UTOPIA Level 3 interface, described, for instance, in the ATM Forum specification AF-PHY-0143.000 (2000), the disclosure of which has already been incorporated by reference. These blocks can be either 48 bytes long (e.g., for AAL2 cells) or from 1-64 bytes long (e.g., frame-based traffic). Higher-level PDUs larger than these block sizes are broken into multiple blocks. At the end of a PDU, the fast pattern processor 210 sends a transmit command that describes the PDU with the FPP-DID. It should be noted that, from the perspective of the voice packet processor 220, an ATM cell is a one-block AAL2 cell. A CPS packet is a one- or two-block PDU. Other types of PDUs (e.g., bypass) may range from one block to over 1300 blocks.

The fast pattern processor 210 determines FPP-DIDs for incoming ATM cells based on a portion of their VPI/VCI values or a user-specified value, as described above in reference to FIG. 2A. Additionally, the fast pattern processor 210 determines FPP-DIDs for incoming CPS packets based on a unique conversation indicated in a DSP header provided by the voice system 120. The DSP header is provided to the fast pattern processor 210 through a transfer and is associated with an incoming CPS packet. The voice system 120 therefore selects a unique conversation for a CPS packet and provides this unique conversation to the fast pattern processor 210 via a DSP header. A unique conversation is defined by a virtual channel-CID combination. In other words, two unique conversations could have the same CID but could have different virtual channels. FPP-DIDs for all other traffic types are irrelevant to the voice packet processor 220. While the VPI/VCI for an incoming ATM cell is 24 bits, the resulting FPP-DID is only 21 bits long. FPP-DIDs are described in more detail below.

Because the fast pattern processor 210 transfers several types of PDUs to the voice packet processor 220, the fast pattern processor 210 has to indicate to the voice packet processor 220 the type of PDU in the current transmission. Referring now to FIG. 6, a data format 600 is shown that is used in a transmission between a fast pattern processor 210 and a voice packet processor 220. This data format 600 is used to inform the voice packet processor 220 of the type of data being transferred.

The fast pattern processor 210 indicates PDU data type through priority queue bits in the port field of a POS data transfer, described in the ATM Forum specification AF-PHY-0143.000 (2000), the disclosure of which has already been incorporated by reference. This field is part of the fQueue or fQueueEOF command sent for the block. These commands are part of the POS-PHY/UTOPIA Level 3 interface, described in the ATM Forum specification AF-PHY-0143.000 (2000), which has been incorporated by reference above. This POS port field is illustrated as data format 600 shown in FIG. 6. It should be noted that priority queue bits are present with each data transfer, but are not valid in the transmit command. The voice packet processor 220 should maintain state on the appropriate location of the transmit command. A setting of "01" for the priority queue bits indicates an AAL2 cell, while a setting of "10" indicates a CPS packet. All other settings indicate a bypass PDU.

The priority queue bits do not indicate whether the data type represents management data or normal voice data. Instead, this is indicated by the UUI field of the CPS packet.

For frame-based packets from the fast pattern processor 210, providing data type identification using the priority queue bits requires some format modification of frame-based packets in the fast pattern processor 210. If multiple data types (as seen by the voice packet processor 220) enter the fast pattern processor 210 over the same frame-based port, the packets may be greater than 64 bytes and therefore require multiple fast pattern processor POS blocks to send them to the voice packet processor 220. Because the fast pattern processor 210 has no first pass processing mechanism to save priority queue information between first and subsequent blocks, the fast pattern processor 210 requires the last block of the packet to contain priority queue information. For this reason, it is beneficial to have frame-based packets destined for voice packet processor 220 processing to have a one-byte trailer. However, these packets must then also contain priority queue bits.

The seven bits of context shown in data format 600 of FIG. 6 is used because the fast pattern processor 210 supports multithreading, where each thread is considered to be a context. The context field thus provides a way of linking data from the same context but sent at different times.

It should be noted that the voice packet processor 220 to routing switch processor 230 interface may be configured in a similar manner. For example, when the voice packet processor 220 sends a PDU to the routing switch processor 230, the data format 600 is used to inform the routing switch processor 230 of the data type of the PDU. The voice packet processor 220 sends AAL2 cells and CPS packets, each with a transmit command to the routing switch processor 230 (in addition to all bypassed data and transmit commands), indicating an RSP-DID and a data type. The VPP provides an RSP-DID for AAL2 cells and CPS packets so that the routing switch processor 230 can determine the required ATM header of the cell and the required transmit queue. The transmit queue is part of the routing switch processor 230. As described above in reference to FIG. 2B, the VPI/VCI is determined by the routing switch processor 230 through a table lookup using the RSP-DID. The VPP indicates PDU data type through the priority queue bits in the port field of the POS data transfer, as described above. It should be noted that the context number for AAL2 cells and CPS packets is fixed. As previously described, the priority queue does not indicate whether the data type represents management data or normal voice data.

Figure 7:
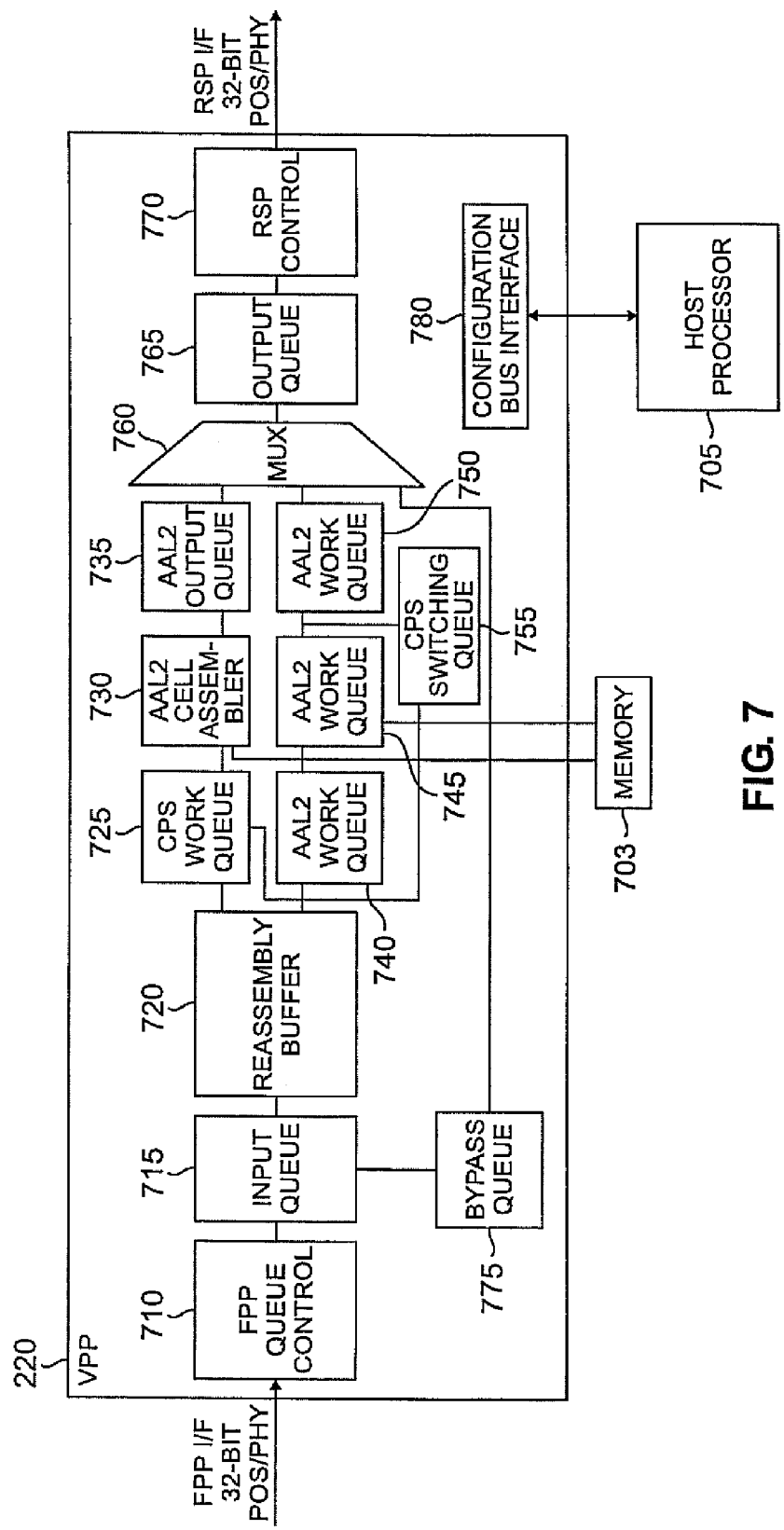
FIG. 7 is an example of a voice packet processor operating in accordance with the present invention.

Referring now to FIG. 7, a block diagram is shown of a voice packet processor 220 operating in accordance with the present invention. The voice packet processor 220 is shown interoperating with a memory 703 and a host processor 705. Voice packet processor 220 comprises an FPP queue control block 710, an input queue 715, a reassembly buffer 720, a CPS work queue 725, an AAL2 cell assembler 730, an AAL2 output queue 735, an AAL2 work queue 740, an AAL2 cell parser 745, a CPS output queue 750, a multiplexer (MUX) 760, an output queue 765, an RSP control block 770, and a bypass queue 775.

Before proceeding with a detailed description of voice packet processor 220, a brief description of how the voice packet processor 220 routes information, in accordance with the present invention, is helpful. As described above, three types of incoming PDUs are presented to the voice packet processor 220: AAL2 cells, CPS packets, and other PDUs. Incoming PDUs other than AAL2 cells and CPS packets are passed through the bypass queue 775 and output to MUX 760.

Incoming CPS packets pass through the CPS work queue 725 and to the AAL2 cell assembler 730. Additionally, reassembled CPS packets that are being switched between AAL2 cell streams also pass through the CPS work queue 725 and to the AAL2 cell assembler 730. The AAL2 cell assembler 730 assembles AAL2 cells from the incoming and reassembled CPS packets. The incoming CPS packets will have an FPP-DID associated with them. The AAL2 cell assembler 730 uses this FPP-DID to determine an RSP-DID. The RSP-DID is output to the routing switch processor 230 along with an AAL2 cell. The RSP-DID is related to the VPI/VCI, as described above, and therefore defines a virtual channel.

Incoming AAL2 cells pass through the AAL2 work queue 740 and the AAL2 cell parser 745. The AAL2 cell parser 745 reassembles CPS packets from an incoming AAL2 cell stream. At the AAL2 cell parser 745, a decision is made as to whether a reassembled CPS packet from the incoming AAL2 cell stream will be output or will be switched back into an outgoing AAL2 cell stream. To make this decision, the AAL2 cell parser 745 uses the FPP-DID, provided by the fast pattern processor 210, to determine an RSP-DID. In an embodiment of the present invention, the FPP-DID to RSP-DID conversion is done through a lookup performed on a table, although any other suitable technique for converting addresses may be used. This lookup also produces an indicator that determines whether a reassembled CPS packet is to be switched and, therefore, routed to the CPS switching queue 755 or not switched and sent to the routing switch processor 230, through the CPS output queue 750, for transmission.

If the reassembled CPS packet is routed to the CPS switching queue 755, the RSP-DID that has been determined by the AAL2 cell parser 745 and that is to be used with the reassembled CPS packet is forwarded, along with the reassembled CPS packet, to the AAL2 cell assembler 730. The RSP-DID is used by the AAL2 cell assembler 730 to determine another RSP-DID. The RSP-DID from the AAL2 cell parser 745 stands in place of the FPP-DID used during operation with an incoming CPS packet. The second RSP-DID is output to the routing switch processor 230 along with an AAL2 cell. The second RSP-DID is related to the VPI/VCI, and therefore defines a virtual channel. During this process of determining the DIDs, the virtual channel is determined for the ATM cell into which the outgoing AAL2 cell will be placed. The determined virtual channel can be, and generally will be, different than the virtual channel of the ATM cell in which the CPS packet originally arrived.

Moreover, when the AAL2 cell assembler 730 determines the RSP-DID, it can also determine if the CID in the CPS packet should be replaced. If so, a new CID, also determined during the lookup that determines the RSP-DID, is assigned to the CPS packet.

Thus, not only can the virtual channel be changed for switched CPS packets, but the conversation identification can also be changed.

If the reassembled CPS packet is not routed to the CPS switching queue 755, then the reassembled CPS packet passes through the CPS output queue 750, along with the RSP-DID, and to the routing switch processor 230, which uses the RSP-DID to route the CPS packet.

Now that an overview of the voice packet processor 220 has been given, a more detailed description of the voice packet processor 220 will be presented.

The FPP queue control block 710 communicates with the fast pattern processor 210 and controls the rate that PDUs enter the voice packet processor 220. As described above, the incoming PDU data type is marked via priority queue bits, and the FPP queue control block 710 can determine the status of these bits and mark the PDUs appropriately. The input queue 715 stores incoming traffic from the fast pattern processor 210 until it is sent to the reassembly buffer 720 or the bypass queue 775.

The reassembly buffer 720 temporarily holds AAL2 cells awaiting transmit commands, or CPS packets awaiting subsequent packet blocks and/or transmit commands. In addition, it provides a reordering mechanism to ensure that AAL2 cells and CPS packets are processed in order. It should be noted that bypassed traffic does not enter the reassembly buffer, but is, instead, placed directly into the bypass queue 775.

The bypass queue is a burst-matching storage structure for POS blocks to be bypassed. It will be approximately 10-20 entries deep, and it should have the highest transmit priority because it can contain large entries that should complete in the routing switch processor 230 before succeeding small entries can be processed.

The CPS work queue 725 holds CPS packets that have been completely received and placed in order so that they may be assembled into AAL2 cells. The CPS work queue 725 is approximately 10-20 packets deep, and the CPS work queue 725 receives inputs from two sources: the fast pattern processor 210, via the input queue 715 and reassembly buffer 720; and the CPS switching queue 755, used for CPS packet switching.

The AAL2 cell assembler 730 assembles AAL2 cells from portions of CPS packets and complete CPS packets. Because the AAL2 cells can hold multiple portions of CPS packets, complete CPS packets, or both, the AAL2 cell assembler 730 can create partial AAL2 cells. This is described in more detail below. These partial AAL2 cells are completed prior to being passed to the AAL2 output queue. As previously described, the AAL2 cell assembler 730 also determines RSP-DIDs. This is also described in more detail below.

The AAL2 cell assembler 730 holds partial AAL2 cells and other information in memory 703. Memory 703 can be built into voice packet processor 220 or housed off the voice packet processor 220, as the example of FIG. 7 shows.

The AAL2 output queue 735 holds the newly assembled AAL2 cells bound for the output queue 765 and, subsequently, to the routing switch processor 230. This is also beneficially approximately 10-20 cells deep, and this queue contains the information needed to produce the transmit command for the AAL2 cell.

The AAL2 work queue 740 holds AAL2 cells that have been completely received and are in order so that they may be parsed into CPS packets. This queue is generally approximately 10-20 cells deep, and this queue receives input from the fast pattern processor 210, via the input queue 715 and reassembly buffer 720.

The AAL2 cell parser 745 parses the AAL2 cells and determines partial and complete CPS packets. The partial CPS packets are completed prior to being placed in the AAL2 output queue 735. As described above, the AAL2 cell parser 745 also determines whether CPS packets should be switched or output. This is described in more detail below.

The AAL2 cell parser 745 also accesses memory 703 in order to store partial and complete CPS packets and other information. This is also described in more detail below.

The CPS output queue 750 holds the newly parsed CPS packets bound for the output queue 765 to the routing switch processor 230. This queue is approximately 10-20 packets deep, and this queue contains the information needed to produce the transmit command for the CPS packet.

The CPS switching queue 755 allows the switching of CPS packets from one stream to another by sending CPS packets back to the CPS work queue 725 for assembly into different AAL2 cells. This queue is also approximately 10-20 packets deep, and this queue contains the information needed to produce the transmit command for the CPS packet.

MUX 760 multiplexes output cells or packets from the AAL2 output queue 735, CPS output queue 750, and bypass queue 775.

The output queue 765 stores newly parsed or assembled AAL2 cells and CPS packets bound for the routing switch processor 230 and stores cells or packets from the bypass queue 755. The RSP control block 770 acts as an interface between the voice packet processor 220 and the routing switch processor 230. As such, it sends PDUs to the routing switch processor 230, along with the RSP-DID and any other necessary information (e.g., a transmit command). As described above, the PDU data type is marked via priority queue bits. Also, all AAL2 cells will be transmitted from the voice packet processor 220 on index zero, CPS packets on index one, and bypass traffic on the same index as transmitted from the fast pattern processor 210.

The host processor 705 is a computer system adapted to allow users to configure the voice packet processor 220 (and also the fast pattern processor 210 and routing switch processor 230) via a configuration bus interface 780. The host processor 705, among other possible functions, loads the tables used to determine the FPP-DIDs, RSP-DIDs, and replacement CIDs. These tables are described in more detail below. The host processor 705 can set the data in the tables in order to route CPS packets between virtual channels and to change CIDs for CPS packets that are switched between AAL2 cell streams.

Figure 8:
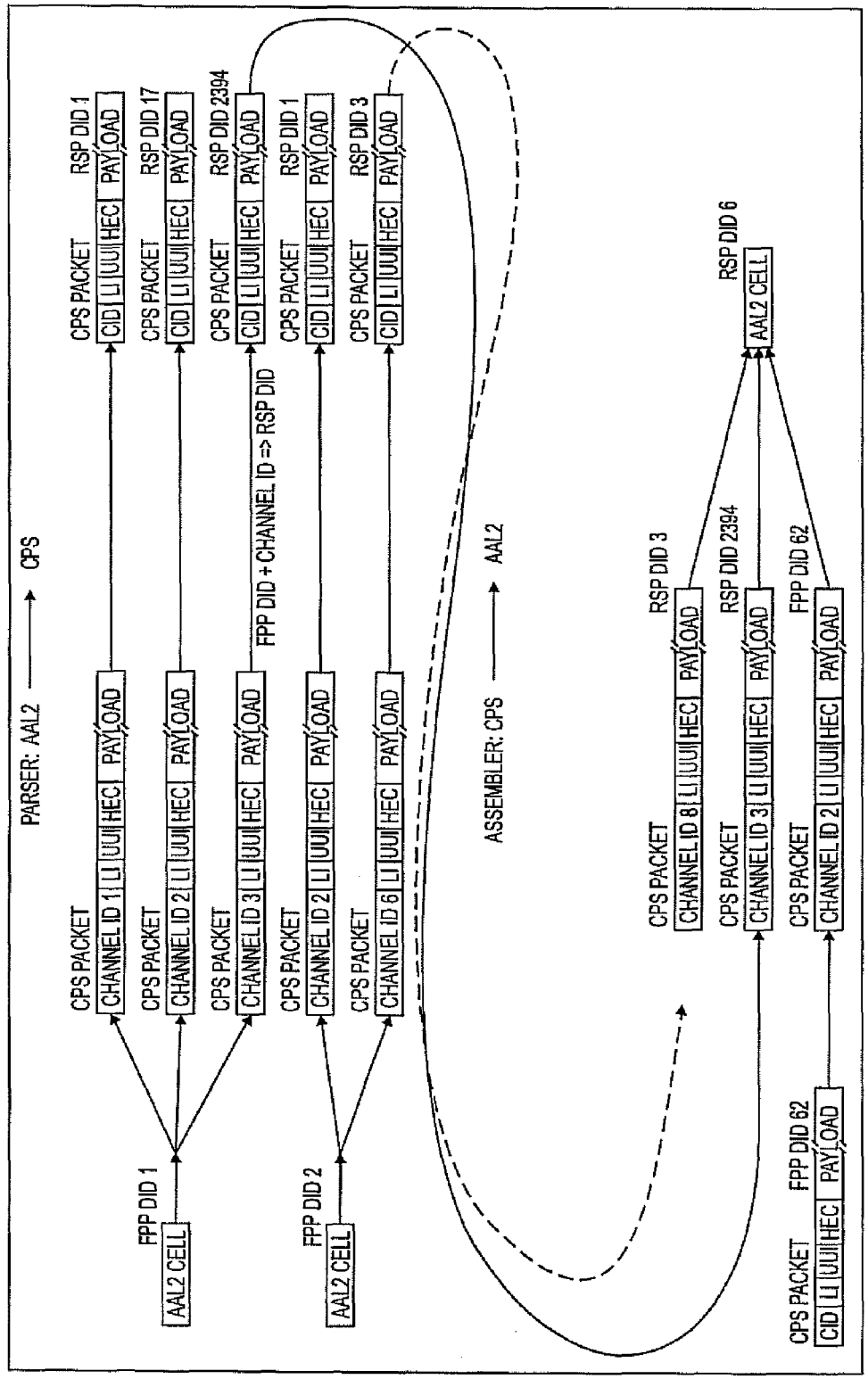
FIG. 8 is a block diagram of exemplary data flow through a voice packet processor, in accordance with a preferred embodiment of the invention.

Turning now to FIG. 8, a block diagram of exemplary data flow through the voice packet processor 220 is shown. The top of the block diagram shows flow in the AAL2 cell parser, and the bottom of the block diagram shows flow in the AAL2 cell assembler. Additionally, two CPS packets are shown being switched between AAL2 cell streams.

The AAL2 cell with the FPP-DID of 1 is parsed by the AAL2 cell parser into reassembled CPS packets with CIDs of 1, 2, and 3. The AAL2 cell with the FPP-DID of 2 is parsed by the AAL2 cell parser into reassembled CPS packets with CIDs of 2 and 6. As described in more detail in reference to FIG. 9A, the FPP-DID and the CID is used for each reassembled CPS packet to determine an RSP-DID. During this process, a determination is made as to whether the reassembled CPS packet is to be switched to an outgoing AAL2 cell stream. In this example, the reassembled CPS packets with RSP-DIDs of 1 and 17 are not switched and are, instead, output to the AAL2 output queue. The CPS packets with RSP-DIDs of 2394 and 3 are switched.

It has been determined (e.g., by the AAL2 cell assembler) that the reassembled CPS packet with the RSP-DID of 2394 should not have its CID modified. To determine this, the AAL2 cell assembler, for instance, uses the RSP-DID of 2394 and the CID of 3 to determine an FPP-DID by reading state information (described below). This process not only determines the FPP-DID of "RSP DID 6," but also determines whether the CID of the reassembled CPS packet should be modified. In the case of the reassembled CPS packet with the RSP-DID of 2394, the CID of this packet has been determined to not need modification. Therefore, the CID of 3 remains the same during this process.

It has been determined (e.g., by the AAL2 cell assembler) that the reassembled CPS packet with the RSP-DID of 3, however, should have its CID modified. The AAL2 cell assembler, for example, uses the RSP-DID of 3 and the CID of 3 to determine an FPP-DID by reading assembler state information (described below). This process not only determines the FPP-DID of "RSP DID 6," but also determines whether the CID of the reassembled CPS packet should be modified. In the case of the reassembled CPS packet with the RSP-DID of 3, it has been determined that the CID of this packet should be modified. Therefore, the original CID of 6 is changed to the new CID of 8. The new CID of 8 is read from assembler state information.

These two reassembled CPS packets are combined into one AAL2 cell. Additionally, an incoming CPS packet having an FPP-DID of 62 is also combined into the AAL2 cell. The FPP-DID of 62 is used to determine the RSP-DID of "RSP DID 6."

FIGS. 9A through 9C show flow, through an AAL2 cell parser, of an FPP-DID. As described above, an AAL2 cell parser creates CPS packets from AAL2 cells from an incoming AAL2 cell stream. The FPP-DID is used to determine an RSP-DID. The form of the RSP-DID is determined by the type of CPS packet involved.

For non-Type 3 CPS packets and active conversations, the FPP-DID is 14 bits wide and describes, as stated above, the AAL2 virtual channel as defined by the VPI/VCI of the AAL2 cell. The FPP-DID is concatenated, as shown in FIG. 9A, with the 8 bits of CID for each individual CPS packet to form an address to the AAL2 to CPS RSP-DID lookup table 910. Entries in table 910 are described in more detail in reference to FIGS. 10 and 11. The result of a lookup using the AAL2 to CPS RSP-DID lookup table 910 is a 15-bit per conversation index. This 15-bit per conversation index is used as both data and an address. This lookup also produces one bit that determines the destination queue of the CPS packet (i.e., whether output to the routing switch processor 230 or switch the packet through the CPS switching path). The per conversation index is used to index into a per conversation statistics table 920. As shown in FIG. 9B, the FPP-DID directly indexes an AAL2 to CPS state table 930 (described in more detail in reference to FIG. 12), the AAL2 to CPS packet partial storage table 940 (described in more detail in reference to FIGS. 13, 14A, and 14B), and the per virtual channel statistics table 950. The 15 bits of conversation index allow for up to 32767 conversations spread across an allowed 16383 virtual channels. The 15-bit per conversation index is also concatenated, as shown in FIG. 9C, with a provisionable base register (e.g., a unique base register for AAL2 to CPS RSP-DIDs) to produce the RSP-DID. The per conversation statistics table 920 and per virtual channel statistics table 950 are used to maintain statistical information on a conversation and virtual channel basis, respectively.

It should be noted that the tables 910 through 950, and other tables described herein, are generally stored in a localized memory, such as memory 703 of FIG. 7. However, where and how the tables are stored is not a requirement of the present invention and many different types and locations of memory are suitable.

For Type 3 CPS packets and active conversations, the flow is the same as above except that the Type 3 UUI field (i.e., of decimal 24 or 31) in the CPS packet is detected. The RSP-DID, as a unique provisioned value, therefore causes the routing switch processor 230 to send the packet to the host, such as host processor 705 of FIG. 7, rather than to the result of the lookup in the AAL2 to CPS RSP-DID lookup table 910. Additionally, the FPP-DID is appended to the beginning of the CPS packet so that the host can fully identify the CPS packet.

For Type 3 CPS packet with inactive CIDs but active VCs, the flow is the same as above except that the Type 3 UUI field (i.e., of decimal 24 or 31) in the CPS packet is detected and the result of the lookup in the AAL2 to CPS RSP-DID lookup table 910 is zero. The RSP-DID flow is the same as in the case of Type 3 packets on active conversations except that there is a different provisioned RSP-DID number, which means that one single RSP-DID is assigned for every inactive CID.

Turning now to FIGS. 10 and 11, FIG. 10 shows a block diagram of an entry in the AAL2 to CPS RSP-DID lookup table 910, and FIG. 11 shows a table describing the variables in FIG. 10. The entry comprises a one bit CPS packet switch indication and a 15 bit per conservation index. The one bit CPS packet switch indication has two settings, one to enable switching and one to disable switching. During a lookup using the AAL2 to CPS RSP-DID lookup table 910, a determination as to switching is made by reading the state of the CPS packet switch indication.

As AAL2 cells are received, each AAL2 cell may contain whole CPS packets, partial CPS packets, or some combination of partial and whole CPS packets. FIGS. 12 through 14B describe one example of how partial CPS packets can be stored until the partial CPS packets can be completed.

In FIG. 12, an exemplary memory configuration is shown. This memory configuration stores a partial CPS packet. This memory configuration corresponds to a single entry in the AAL2 to CPS partial storage table 940. To keep track of what is in the memory configuration of FIG. 12, entries are made in the AAL2 to CPS state table 930.

Figure 13:
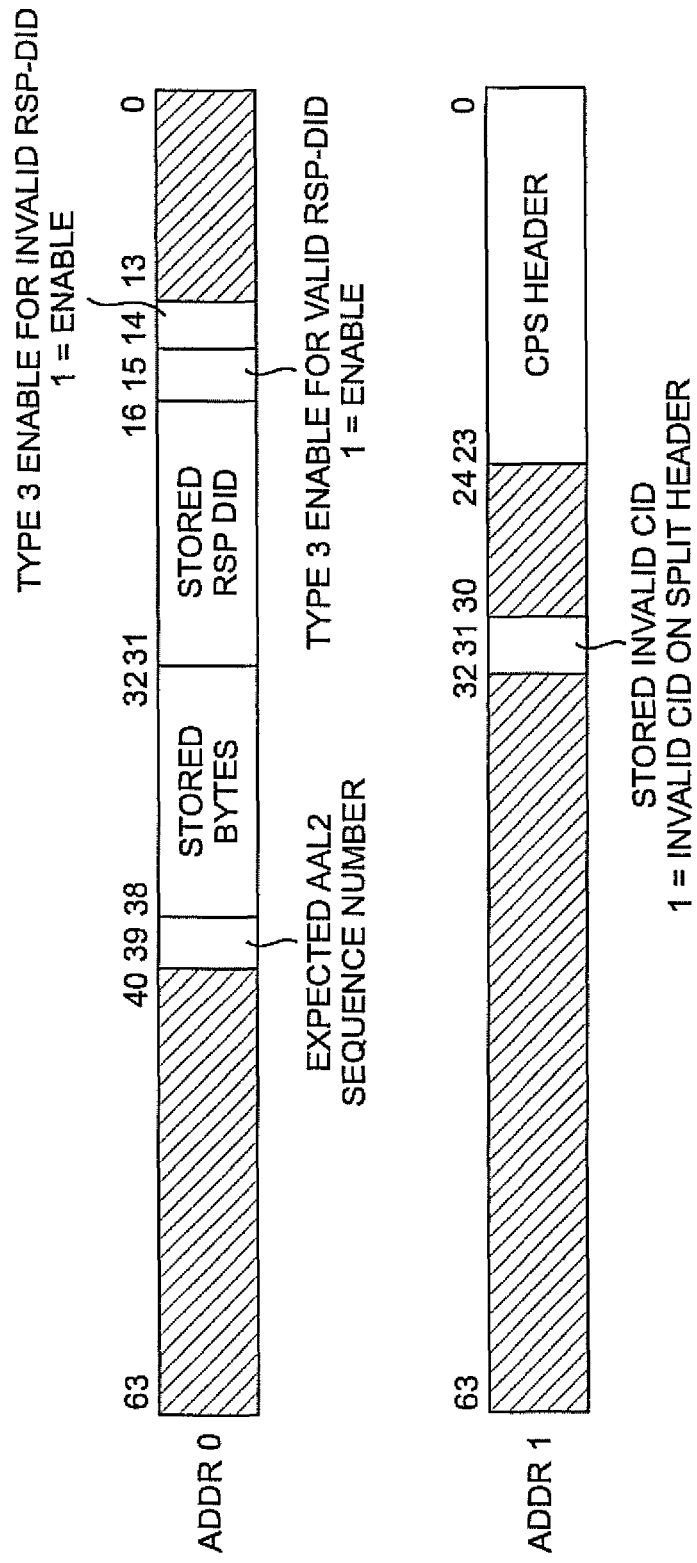
FIG. 13 shows an example of an entry in an AAL2 to CPS state table, in accordance with a preferred embodiment of the invention.

FIG. 13 shows an example of an entry in the AAL2 to CPS state table 930, and FIGS. 14A and 14B describe the variables used therein. It should be noted that the "Stored Output RSP-DID" is 16 bits long (see FIG. 13) and also stores the "CPS Packet Switch Indication," shown in FIG. 11, in addition to 15 bits of RSP-DID. Because the CPS Packet Switch Indication is stored, once the CPS packet is completely reassembled, the CPS Packet Switch Indication is used to determine whether the reassembled CPS packet should be switched to the AAL2 assembler.

Figures 15A, 15B:
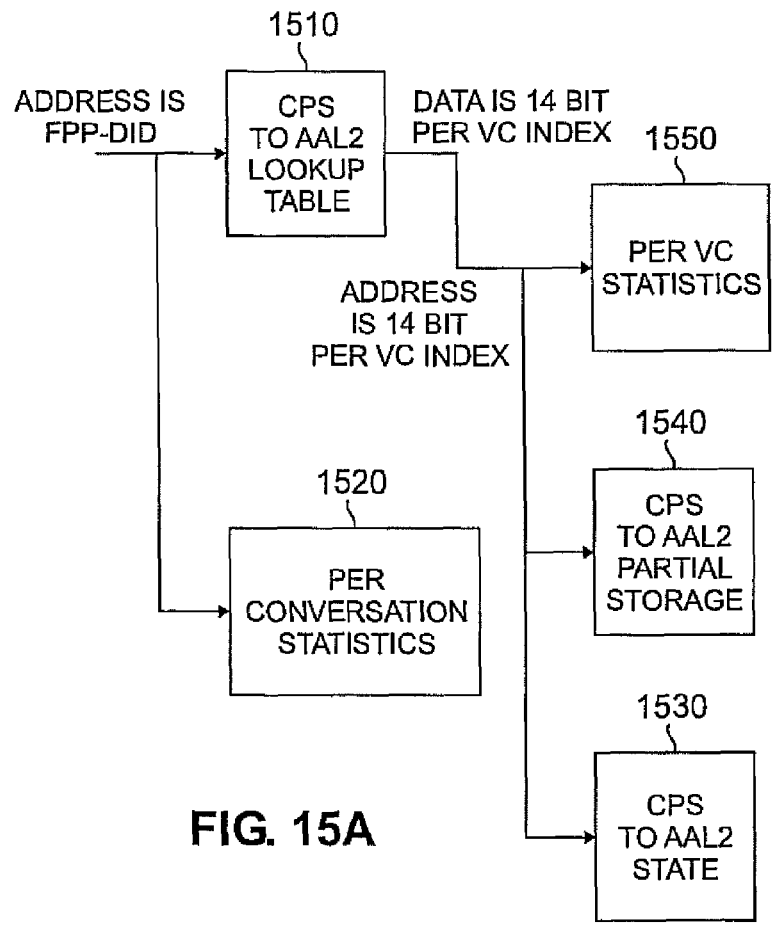
FIGS. 15A and 15B show flow, through an AAL2 cell assembler, of an FPP-DID in accordance with a preferred embodiment of the invention.

FIGS. 15A and 15B show flow, through an AAL2 cell assembler, of an FPP-DID. As described above, an AAL2 cell assembler assembles AAL2 cells from CPS packets. The FPP-DID is used to determine an RSP-DID. The exact form of the RSP-DID is determined by the type of CPS packet involved.

For non-Type 3 Packets and active conversations, the FPP-DID is 15 bits wide and describes the active conversation number of this packet. For a CPS packet, an active conversation number is defined by the virtual channel and CID. This allows for up to 32767 conversations spread across an allowed 16383 VCs. Note that the FPP-DID for a CPS packet is 15 bits wide while the FPP-DID for an AAL2 cell is 14 bits wide. As shown in FIG. 15A, the FPP-DID is used to index a CPS to AAL2 lookup table 1510 (described below in reference to FIGS. 16 and 17) to retrieve a 14-bit virtual channel index, which is used both as data and an address. The FPP-DID is also used to index the per conversation statistics block 1520 for the CPS packet to AAL2 direction. The 14-bit virtual channel index is used to index a CPS to AAL2 state table 1530 (described below in reference to FIGS. 19 and 20), a CPS to AAL2 partial storage table 1540 (described below in reference to FIG. 18), and a per-virtual channel statistics block 1550 for the CPS to AAL2 direction. As shown in FIG. 15B, the 14-bit virtual channel index is concatenated with a unique base register for the CPS to AAL2 direction to form the RSP-DID for the outgoing AAL2 cells. It should be noted that many FPP-DID indexed lookup entries may result in the same virtual channel index corresponding to many CPS packets destined for the same AAL2 virtual channel.

For Type 3 CPS packets and active conversations, the flow is the same as above except that the UUI field of the CPS packet matches either decimal 24 or 31. However, because the voice packet processor 220 does not handle these packets differently than non-Type 3 packets, each Type 3 packet is inserted into the appropriate AAL2 cell along with Non-Type 3 packets.

The per conversation statistics table 1520 and per virtual channel statistics table 1550 are used to gather statistics on a per conversation and per virtual channel basis, respectively.

Turning now to FIGS. 16 and 17, FIG. 16 shows a block diagram of an entry in the CPS to AAL2 lookup table 1510 and FIG. 17 shows a table describing the variables in FIG. 16. Of particular note are the CID variable and CID modification enable variable. The CID modification enable determines whether the current CID of a CPS packet is to be replaced with the CID stored in an entry in the CPS to AAL2 lookup table 1510. Thus, a host processor can change the CID of incoming CPS packets or packets that are being switched via these two variables.

As AAL2 cells are created, each AAL2 cell may contain whole CPS packets, partial CPS packets, or some combination of partial and whole CPS packets. Additionally, each CPS packet is associated with a particular virtual channel. At any time, there may not be enough CPS packets, associated with a particular virtual channel, to create an entire AAL2 cell for a virtual channel. Consequently, there will generally be partial AAL2 cells that are in some state of construction. FIGS. 18 through 20 describe one example of how partial AAL2 cells can be stored until the AAL2 cells can be completed.

In FIG. 18, an exemplary memory configuration is shown. This memory configuration stores a partial AAL2 cell. This memory configuration corresponds to a single entry in the CPS to AAL2 lookup table 1510. To keep track of what is in the memory configuration of FIG. 18, entries are made in the CPS to AAL2 state table 1530.

FIG. 19 shows an example of an entry in the CPS to AAL2 state table 1530, and FIG. 20 describes the variables used therein. It should be noted that the CPS packets that are to have their CIDs modified, according to the "CID modification enable" of FIG. 17, are stored with the CID already modified.

A note should be made about DIDs during CPS switching. To switch CPS packets, the AAL2 parser reads the CPS packet switch indication. CPS packets that are to be switched according to the CPS packet switch indication are sent to the CPS switching queue (see FIG. 7). The RSP-DID determined by the AAL2 parser becomes the "FPP-DID" input to the AAL2 cell assembler, and the AAL2 cell assembler uses the RSP-DID determined by the AAL2 parser to determine another RSP-DID for the particular CPS packet. To change the CID, the AAL2 cell assembler uses the CID and CID modification enable of FIGS. 16 and 17 to replace the current CID of the CPS packet with the CID defined by the CID variable of FIGS. 16 and 17 and by an entry holding the CID variable in the CPS to AAL2 lookup table 1510.

For bypass data, the full transmit command is bypassed, and the range, value, and meaning of the FPP-DID are irrelevant to the VPP.

It is to be understood that the embodiments and variations shown and described herein are merely illustrative of the principles of this invention and that various modifications may be implemented by those skilled in the art without departing from the scope and spirit of the invention For example, the AAL2 cell assembly and AAL2 cell parsing circuitry could be implemented by two different network processors. Additionally, CPS packets could comprise image data, video data or other data. Finally, the methods disclosed herein may be implemented in an article of manufacture comprising a machine-readable storage medium for use in conjunction with a processor, the medium storing one or more software programs for switching packets between streams of cells.

What is claimed is:

1. A processor comprising:
    assembly circuitry configured to select an ATM virtual channel for an outgoing cell, the outgoing cell comprising at least a portion of a reassembled packet, the reassembled packet corresponding to a certain ATM virtual channel identification, the assembly circuitry configured to (i) determine whether the ATM virtual channel identification for a particular reassembled packet is to be replaced; (ii) replace the ATM virtual channel identification for the particular reassembled packet when it is determined that the ATM virtual channel identification for a particular reassembled packet is to be replaced; and (iii) select the ATM virtual channel for the outgoing cell so that the selected ATM virtual channel is different than the certain ATM virtual channel associated with said certain ATM virtual channel identification, such that said at least a portion of said reassembled packet in said outgoing cell is retransmitted through said selected ATM virtual channel that is different than said certain ATM virtual channel; and
    routing circuitry configured to select the ATM virtual channel for the outgoing cell.

2. The processor of claim 1, wherein the reassembled packet corresponds to an incoming destination identification, and wherein the assembly circuitry is further configured to use the incoming destination identification to determine an output destination identification, the output destination identification at least partially defining the selected ATM virtual channel.

3. The processor of claim 2, wherein the assembly circuitry is further configured to cause partially assembled outgoing cells to be stored and an output destination identification corresponding to each partially assembled outgoing cell to be stored.

4. The processor of claim 3, wherein the assembly circuitry is further configured to determine the output destination identification through at least one table access using the incoming destination identification, and wherein the output destination identification is determined prior to storing a partially assembled outgoing cell.

5. The processor of claim 3, wherein the reassembled packet corresponds to an ATM virtual channel identification, wherein the assembly circuitry is further configured to determine whether the ATM virtual channel identification of the reassembled packet is to be replaced, and wherein the assembly circuitry replaces the ATM virtual channel identification of the reassembled packet prior to storing the reassembled packet or a portion thereof in a partially assembled outgoing cell.

6. The processor of claim 2, wherein the assembly circuitry is further configured to determine the output destination identification by using the incoming destination identification as an address into a table to determine an index, the assembly circuitry further configured to combine a register with the index, the combination of the register and the index determining the output destination identification.

7. The processor of claim 2, wherein said routing circuitry is coupled to the assembly circuitry and configured to select, by using the output destination identification, the ATM virtual channel for the outgoing cell.

8. The processor of claim 6, wherein the routing circuitry is further configured to select the ATM virtual channel for the outgoing cell by using the output destination identification as an address into a table to determine a corresponding ATM virtual channel defined by an entry at the address.

9. The processor of claim 1, wherein the reassembled packet corresponds to an original ATM virtual channel identification, and wherein the assembly circuitry is further configured to determine whether the original ATM virtual channel identification is to be replaced by another ATM virtual channel identification.

10. The processor of claim 9, wherein the assembly circuitry is further configured to use the incoming destination identification as an address into a first table to determine an index, and wherein the assembly circuitry is further configured to use the index as an address into a second table to determine an entry, the entry comprising an indication that determines whether the original ATM virtual channel identification is to be replaced by another ATM virtual channel identification.

11. The processor of claim 9, wherein the assembly circuitry replaces the original ATM virtual channel identification with the other ATM virtual channel identification when the assembly circuitry determines that the original ATM virtual channel identification is to be replaced by the other ATM virtual channel identification.

12. The processor of claim 1, wherein the outgoing cell comprises at least portions of two or more reassembled packets, each of the reassembled packets corresponding to one of a plurality of certain ATM virtual channels, the assembly circuitry configured to select the ATM virtual channel for the outgoing cell so that the selected ATM virtual channel is different than the certain ATM virtual channel or certain ATM virtual channels corresponding to the two or more reassembled packets.

13. A processor comprising:
    assembly circuitry configured to assemble outgoing cells from packets, each outgoing cell comprising at least a portion of a packet;
    parsing circuitry coupled to the assembly circuitry, the parsing circuitry configured to examine incoming cells, each incoming cell comprising at least a portion of one or more packets, and to reassemble packets from at least a portion of one or more of the incoming cells, wherein the parsing circuitry is further configured to select reassembled packets to be switched to the assembly circuitry wherein each reassembled packet corresponds to an incoming ATM virtual channel identification;
    routing circuitry configured to determine whether the ATM virtual channel identification for a particular reassembled packet is to be replaced and replace the ATM virtual channel identification for the particular reassembled packet when it is determined that the ATM virtual channel identification for a particular reassembled packet is to be replaced; and switching circuitry configured to couple the selected reassembled packets to the assembly circuitry, wherein an ATM virtual channel for the outgoing cell is different than an ATM virtual channel corresponding to the reassembled packet, such that said at least a portion of said reassembled packets in said outgoing cells are retransmitted through said ATM virtual channel for the outgoing cell that is different than said ATM virtual channel corresponding to the reassembled packet.

14. The processor of claim 13, wherein the parsing circuitry is further configured to cause partially reassembled packets to be stored and an output destination identification corresponding to each partially reassembled packet to be stored, wherein the parsing circuitry is further configured to determine whether a partially reassembled packet is to be selected, and wherein the parsing circuitry is further configured to cause an indication to be stored that determines whether a partially reassembled packet is to be selected.

15. The processor of claim 13, wherein the assembly circuitry, parsing circuitry and switching circuitry are part of packet circuitry, the processor further comprising pattern circuitry coupled to the packet circuitry, the pattern circuitry configured to determine an incoming destination identification from the ATM virtual channel corresponding to an incoming cell, the incoming destination identification at least partially defining the ATM virtual channel, wherein the pattern circuitry further communicates the incoming destination identification to the packet circuitry.

16. The processor of claim 15, wherein said routing circuitry is coupled to the packet circuitry, wherein the packet circuitry determines an outgoing destination identification based on the incoming destination identification, wherein the packet circuitry communicates the outgoing destination identification to the routing circuitry, and wherein the routing circuitry is configured to select, by using the output destination identification, the ATM virtual channel for the outgoing cell comprising the selected reassembled packet.

17. The processor of claim 13, wherein each incoming cell corresponds to an incoming destination identification, and wherein the parsing circuitry is further configured to use the incoming destination identification in order to determine an output destination identification for a selected assembled packet, the output destination identification at least partially defining the selected ATM virtual channel.

18. The processor of claim 17, wherein each reassembled packet corresponds to an ATM virtual channel identification, wherein the parsing circuitry is further configured to use the incoming destination identification and the ATM virtual channel identification as an address into a first table to determine an index, and wherein the parsing circuitry is further configured to combine a register and the index, the combination determining the output destination identification.

19. The processor of claim 17, wherein the assembly circuitry is further configured to use the output destination identification to determine a second output destination identification corresponding to an outgoing cell, the second output destination identification at least partially defining the selected ATM virtual channel.

20. A method for use in a processor for switching packets between streams of cells, the method comprising the steps of:

assembling outgoing cells from packets, one or more of the outgoing cells comprising at least a portion of a reassembled packet, wherein each outgoing cell is associated with an outgoing ATM virtual channel, and wherein each reassembled packet corresponds to an incoming ATM virtual channel identification, the outgoing cells to be transmitted on an outgoing cell stream and the reassembled packets reassembled from incoming cells received from an incoming cell stream;

determining whether the ATM virtual channel identification for a particular reassembled packet is to be replaced;

replacing the ATM virtual channel identification for the particular reassembled packet when it is determined that the ATM virtual channel identification for a particular reassembled packet is to be replaced; and selecting the outgoing ATM virtual channel for a given outgoing cell comprising at least a portion of a given reassembled packet so that the ATM virtual channel for the selected outgoing cell is different than an incoming ATM virtual channel corresponding to the given reassembled packet, such that said at least a portion of said reassembled packets in said outgoing cells are retransmitted through said selected ATM virtual channel for the selected outgoing cell that is different than said incoming ATM virtual channel corresponding to the given reassembled packet.

21. The method of claim 20, further comprising the step of selecting reassembled packets to be assembled into outgoing cells.

22. The method of claim 21, further comprising the step of reassembling packets from at least a portion of one or more of the incoming cells.

23. The method of claim 21, wherein the step of selecting the reassembled packets further comprises the step of determining an output destination identification from an input destination identification corresponding to a reassembled packet, the step of determining an output destination identification also determining whether the reassembled packet should be selected, the output destination identification at least partially defining the outgoing ATM virtual channel.

24. The method of claim 23, further comprising the step of determining a second destination identification by using the first destination identification, the second destination identification at least partially defining the outgoing ATM virtual channel.

25. The method of claim 24, further comprising the step of determining the outgoing ATM virtual channel by using the second destination identification.

26. The method of claim 20, further comprising the step of determining a destination identification corresponding to an incoming cell by using the ATM virtual channel corresponding to the incoming cell.

27. The method of claim 20, wherein one or more of the outgoing cells comprise at least portions of two or more reassembled packets.

28. An article of manufacture comprising a non-transitory computer-readable recordable storage medium encoded with computer executable instructions for use in conjunction with a processor, the medium storing one or more software programs for switching packets between streams of cells, wherein the one or more programs when executed implement the steps of:

assembling outgoing cells from packets, one or more of the outgoing cells comprising at least a portion of a reassembled packet, wherein each outgoing cell is associated with an outgoing ATM virtual channel, and wherein each reassembled packet corresponds to an incoming ATM virtual channel identification, the outgoing cells to be transmitted on an outgoing cell stream and the reassembled packets reassembled from incoming cells received from an incoming cell stream;

determining whether the ATM virtual channel identification for a particular reassembled packet is to be replaced;

replacing the ATM virtual channel identification for the particular reassembled packet when it is determined that the ATM virtual channel identification for a particular reassembled packet is to be replaced; and selecting the outgoing ATM virtual channel for a given outgoing cell comprising at least a portion of a given reassembled packet so that the ATM virtual channel for the selected outgoing cell is different than an incoming ATM virtual channel corresponding to the given reassembled packet, such that said at least a portion of said reassembled packets in said outgoing cells are retransmitted through said selected ATM virtual channel for the selected outgoing cell that is different than said incoming ATM virtual channel corresponding to the given reassembled packet.

29. The processor of claim 1, wherein said processor is further configured to change a channel identifier of said outgoing cell comprising said at least a portion of said reassembled packet before said outgoing cell is retransmitted.

30. The processor of claim 13, wherein said processor is further configured to change a channel identifier of said outgoing cells comprising said at least a portion of said reassembled packets before said outgoing cells are retransmitted.

31. The method of claim 20, further comprising the step of changing a channel identifier of an outgoing cell comprising said at least a portion of said reassembled packet before said outgoing cell is retransmitted.

* * * * *